(12) United States Patent
Boothe et al.

(10) Patent No.: US 8,671,647 B2
(45) Date of Patent: Mar. 18, 2014

(54) CONTINUOUS PELLETIZING, DRYING AND BAGGING SYSTEMS WITH IMPROVED THROUGHPUT

(75) Inventors: Duane Boothe, Clifton Forge, VA (US); Dwayne Free, Kevil, KY (US); John Bolton, Eagle Rock, VA (US)

(73) Assignee: Gala Industries, Inc., Eagle Rock, VA (US)

( * ) Notice: Subject to any disclaimer, the term of this patent is extended or adjusted under 35 U.S.C. 154(b) by 256 days.

(21) Appl. No.: 13/202,926

(22) PCT Filed: Jun. 22, 2010

(86) PCT No.: PCT/US2010/039513
§ 371 (c)(1),
(2), (4) Date: Aug. 23, 2011

(87) PCT Pub. No.: WO2011/005528
PCT Pub. Date: Jan. 13, 2011

(65) Prior Publication Data
US 2011/0302889 A1 Dec. 15, 2011

Related U.S. Application Data

(60) Provisional application No. 61/219,164, filed on Jun. 22, 2009.

(51) Int. Cl.
*B65B 9/15* (2006.01)
*B65B 63/02* (2006.01)
*B65B 63/08* (2006.01)
*B65B 65/06* (2006.01)

(52) U.S. Cl.
USPC ............... 53/111 R; 53/122; 53/513; 53/529; 53/127; 53/202

(58) Field of Classification Search
CPC .......... B65B 63/08; B65B 63/02; B65B 9/20; B65B 9/15; B65B 65/06
USPC ........... 53/428, 434, 435, 438, 440, 451, 459, 53/469, 111 R, 113, 512, 513, 529, 127, 53/551, 567, 575, 576, 168, 202, 502, 503, 53/385.1
See application file for complete search history.

(56) References Cited

U.S. PATENT DOCUMENTS 2,113,636 A * 4/1938 Vogt ................................ 53/433
2,618,814 A * 11/1952 Paton et al. .................... 156/145

(Continued)

FOREIGN PATENT DOCUMENTS

DE 3640520 A1 * 6/1988 ................ B65B 1/32
JP 52013995 A * 2/1977 ............... B65B 45/00

(Continued)

OTHER PUBLICATIONS

Mexican Office Action dated Sep. 4, 2013 and received on Oct. 7, 2013, for related Mexican Patent Application No. MX/A/2011/008927, 6 pages.

*Primary Examiner* — Stephen F Gerrity
(74) *Attorney, Agent, or Firm* — Benjamin C. Wiles, Esq.; Ryan A. Schneider, Esq.; Troutman Sanders LLP

(57) ABSTRACT

The various embodiments of the present invention are directed to improved processes and systems for continuously bagging materials. In particular, the improved processes and systems can be used to bag tacky materials with improved throughput. The systems generally include at least one of a feeding section, mixing section, pelletizing section, transport piping, agglomerate catcher, defluidizing section, drying section, pellet diverter valve, and/or bagging assembly.

24 Claims, 28 Drawing Sheets

(56) References Cited

U.S. PATENT DOCUMENTS

| | | | | |
|---|---|---|---|---|
| 2,927,763 | A * | 3/1960 | Overman | 177/98 |
| 3,040,490 | A * | 6/1962 | Virta | 53/434 |
| 3,202,084 | A * | 8/1965 | Hale et al. | 99/470 |
| 3,419,414 | A * | 12/1968 | Marks | 428/601 |
| 3,521,426 | A * | 7/1970 | Evins | 53/502 |
| 3,707,172 | A * | 12/1972 | Obara | 141/59 |
| 3,892,834 | A * | 7/1975 | Pritchard | 264/142 |
| 3,989,853 | A * | 11/1976 | Forkner | 426/305 |
| 4,117,645 | A * | 10/1978 | Phillips | 53/431 |
| 4,686,937 | A * | 8/1987 | Rosenfeld | 119/173 |
| 4,688,371 | A * | 8/1987 | Hecht | 53/502 |
| 4,738,287 | A * | 4/1988 | Klinkel | 141/114 |
| 4,872,493 | A * | 10/1989 | Everman | 141/59 |
| 4,964,259 | A * | 10/1990 | Ylvisaker et al. | 53/433 |
| 5,041,251 | A * | 8/1991 | McCoskey et al. | 264/130 |
| 5,077,958 | A * | 1/1992 | Peppard et al. | 53/570 |
| 5,110,641 | A * | 5/1992 | Kean | 428/35.5 |
| 5,531,845 | A * | 7/1996 | Flanigan et al. | 149/109.6 |
| 5,626,004 | A * | 5/1997 | Gates et al. | 53/459 |
| 5,638,660 | A * | 6/1997 | Kuo | 53/449 |
| 5,653,872 | A * | 8/1997 | Cohan | 210/252 |
| 5,895,617 | A * | 4/1999 | Mizuguchi et al. | 264/141 |
| 5,927,049 | A * | 7/1999 | Simard | 53/428 |
| 6,116,001 | A * | 9/2000 | Kammler et al. | 53/551 |
| 6,623,829 | B1 * | 9/2003 | Fuss et al. | 428/71 |
| 7,171,762 | B2 * | 2/2007 | Roberts et al. | 34/312 |
| 8,105,692 | B2 * | 1/2012 | Dumm et al. | 428/408 |
| 2002/0014019 | A1 * | 2/2002 | Hultsch | 34/184 |
| 2004/0074800 | A1 * | 4/2004 | Harwell et al. | 206/484 |
| 2004/0209082 | A1 * | 10/2004 | Lee et al. | 428/407 |
| 2008/0071061 | A1 * | 3/2008 | Bruckmann | 528/480 |
| 2009/0110833 | A1 * | 4/2009 | Wright et al. | 427/299 |

FOREIGN PATENT DOCUMENTS

| | | | | |
|---|---|---|---|---|
| JP | 05032232 A * | 2/1993 | | B65B 51/08 |
| WO | WO 2007064580 A2 * | 6/2007 | | B29C 47/12 |
| WO | 2009059020 | 5/2009 | | |

* cited by examiner

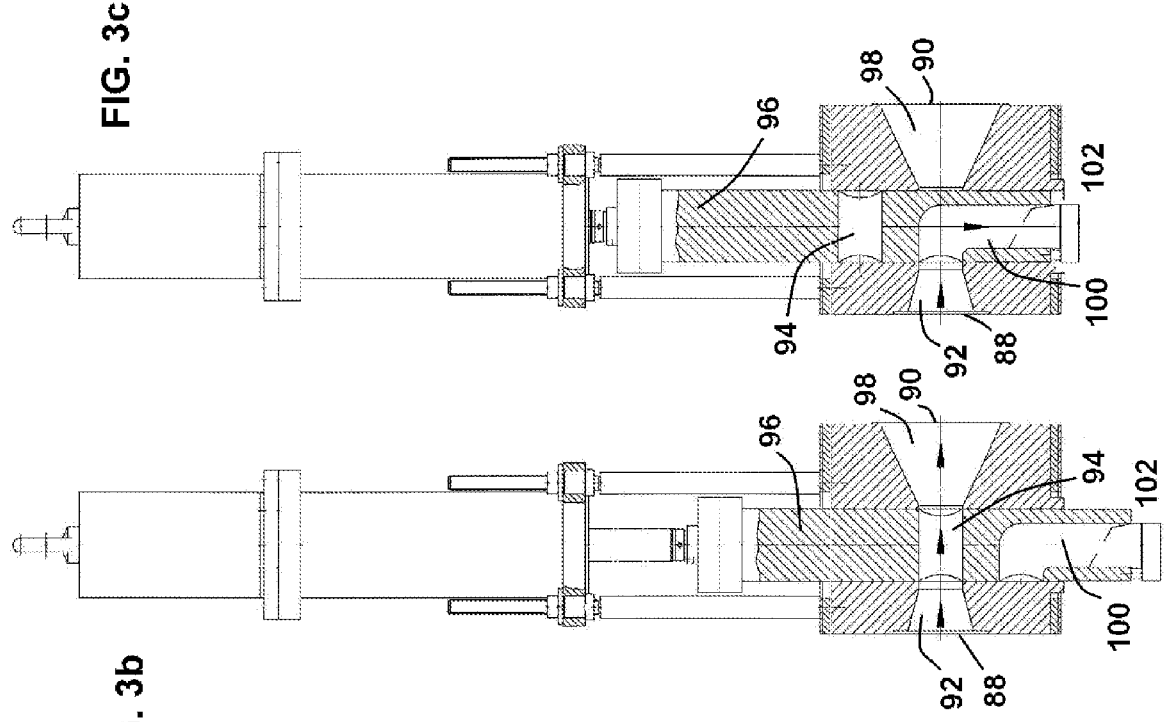
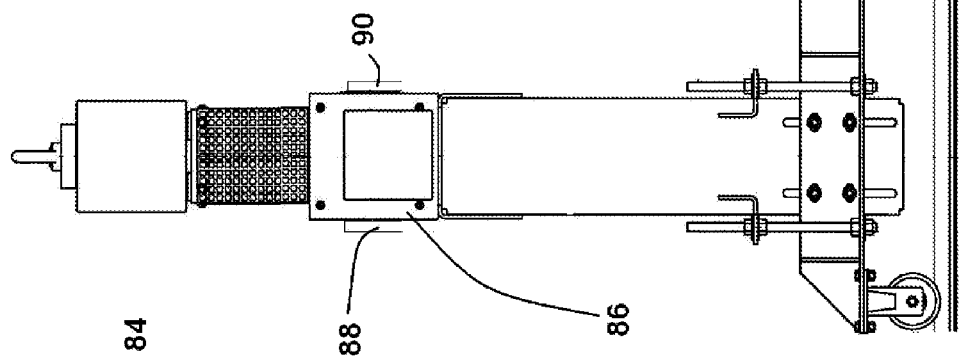

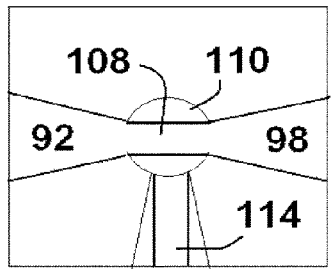
FIG. 4b
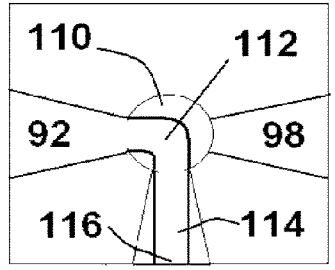
FIG. 4c
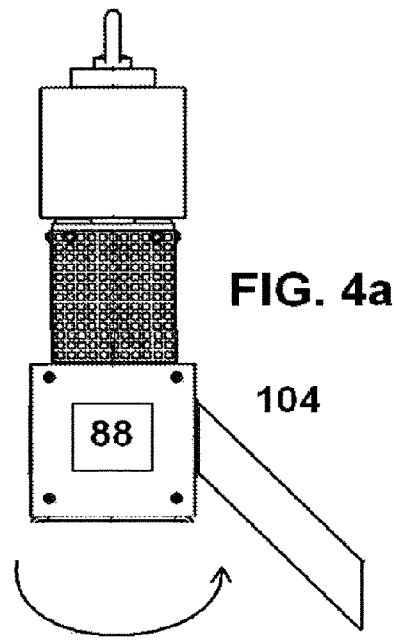
FIG. 4
FIG. 4a
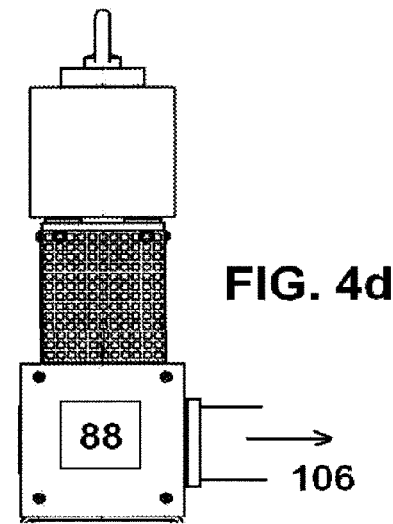
FIG. 4d

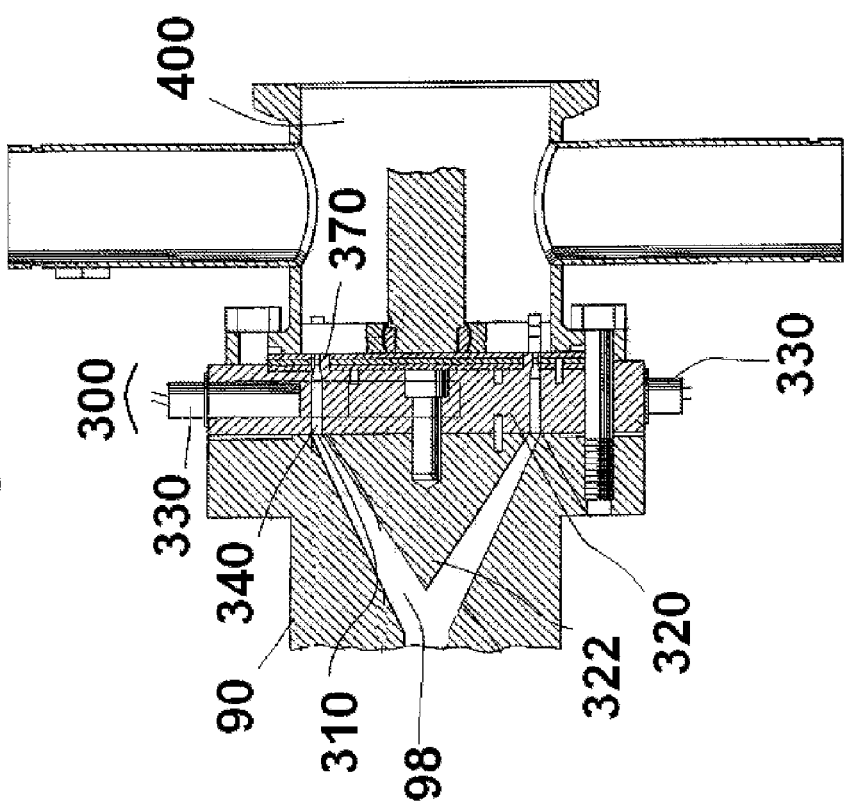
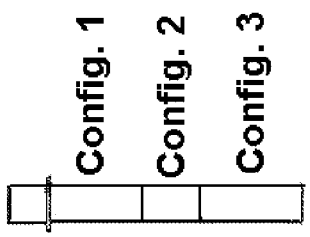
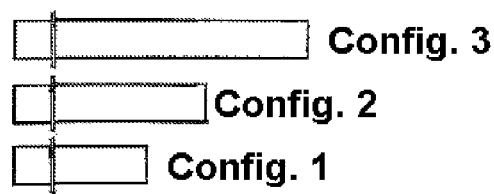
FIG. 6
FIG. 7a
FIG. 7b

CONTINUOUS PELLETIZING, DRYING AND BAGGING SYSTEMS WITH IMPROVED THROUGHPUT

CROSS-REFERENCE TO RELATED APPLICATIONS

The present application claims the benefit of International Patent Application Serial Number PCT/US2010/039513, filed 22 Jun. 2010, which claims the benefit of U.S. Provisional Patent Application Ser. No. 61/219,164, filed 22 Jun. 2009, both of which are hereby incorporated by reference in their entirety as if fully set forth below.

BACKGROUND OF THE INVENTION

1. Field of the Invention

The various embodiments of the present invention generally relate to processes and systems for bagging pellets. More specifically, the various embodiments of the present invention relate to improvements in the throughput capacity for the process of extruding, pelletizing, drying, and bagging of meltable and/or processable materials, specifically those that are tacky at least during processing, so as to provide processes where the meltable and/or processable materials are extruded, pelletized, dried, and bagged continuously at increased throughput rates facilitated by those improvements.

2. Description of the Prior Art

The generally independent processes of, and equipment for use in, extrusion, pelletization, drying, and bagging of polymeric materials are known and have been used in various applications. Over time, the demand for processes and equipment capable of efficiently extruding, pelletizing, drying, and bagging materials and especially tacky materials (e.g., asphalts, hot melt adhesives, and hot melt pressure sensitive adhesives) has increased. Commonly-assigned International Patent Application No. PCT/US10/25255, which is incorporated herein by reference in its entirety as if fully set forth below, discloses a continuous process for the efficient extrusion, pelletization, drying, and subsequent bagging of such materials.

Pelletization equipment and its use following extrusion processing have been implemented for many years by the assignee of the instant application, as demonstrated, for example, in commonly-assigned U.S. Pat. Nos. 4,123,207, 4,251,198, 4,500,271, 4,621,996, 4,728,276, 4,888,990, 5,059,103, 5,403,176, 5,624,688, 6,332,765, 6,551,087, 6,793,473, 6,824,371, 6,925,741, 7,033,152, 7,172,397, 7,267,540, 7,318,719, 7,393,484, and 7,402,034; US Patent Application Publication Nos. 2009/0273112, and 2010/0040716; German Patent and Application Nos. DE 32 43 332, DE 37 02 841, DE 87 01 490, DE 196 42 389, DE 196 51 354, and DE 296 24 638; International Patent Application Publication Nos. WO 2006/081140, WO 2006/087179, WO 2007/064580, WO 2007/089497, WO 2007/142783, WO 2009/147514, and WO 2010/019667; and European Patent Nos. EP 1 218 156, EP 1 556 199, EP 1 582 327, EP 1 841 574, EP 1 851 023, EP 1 954 470, EP 1 970 180, EP 1 984 157, and EP 2 018 257. These patents and patent applications are incorporated herein by reference in their entireties as if fully set forth below.

Similarly, dryer equipment has been used by the assignee of the instant application, as demonstrated, for example, in commonly-assigned U.S. Pat. Nos. 3,458,045, 4,218,323, 4,447,325, 4,565,015, 4,896,435, 5,265,347, 5,638,606, 6,138,375, 6,237,244, 6,739,457, 6,807,748, 7,024,794, 7,171,762, and 7,524,179; US Patent Application Publication Nos. 2006/0130353, 2009/0110833, 2009/0126216, and 2010/0050458; International Patent Application Publication Nos. WO 2006/069022, WO 2008/113560, WO 2008/147514, WO 2009/059020, and WO 2010/028074; German Patent and Application Nos. DE 19 53 741, DE 28 19 443, DE 43 30 078, DE 93 20 744, and DE 197 08 988; and European Patent and Patent Application Nos. EP 1 033 545, EP 1 123 480, EP 1 602 888, EP 1 647 788, EP 1 650 516, EP 1 830 963, EP 2 135 023, and EP 2 147 272. These patents and patent applications are incorporated herein by reference in their entireties as if fully set forth below.

BRIEF SUMMARY

Briefly, the various embodiments of the present invention include several improvements over existing continuous as well as discontinuous processes and apparatuses, resulting in increased throughput capacity of those processes such that pellet blocking, pathway occlusion, undue adherence, sticture of pellets to that equipment, erosion, corrosion, abrasion and wear of the equipment are reduced and controlled.

These continuous processes and systems can be used on any type of formulation and are particularly advantageous to formulations or materials that are prone to be tacky and/or sticky at least during the processing steps. Additionally, these processes and systems are especially beneficial for materials that can be tacky and/or sticky during the processing steps and remain so or become so following the bagging or packaging step(s) of the processes. As used herein, the terms "tacky" or "sticky" refer to a material, component, or formulation that during and/or following processing is in the form of a pellet, granule, powder, or the like that can at least partially adhere to other items to which it comes into contact. These materials, components, or formulations, hereinafter defined as "tacky materials," can also be prone to cold flow as well as deformation under pressure (e.g., stacking and/or in bulk packaging). The tack or stickiness can also be due to migration of components, liquid or solid, included in the formulation as well as to migration and/or rearrangement of portions of the molecules comprising those materials, components, or formulations, including intermolecular and intramolecular phase separation as well as blush or bloom on the surface of the pellets, granules, powders and the like. The tack and/or stickiness of the tacky materials can also arise as a consequence of at least one of the processing steps, as a consequence of the formulation, as well as from packaging or storage, including such conditions exposed to heat and/or pressure. The tacky materials are not limited to those that are soft at ambient temperature.

A few illustrative examples of tacky materials include adhesives such as polyamide adhesives, polyester adhesives, hot melt adhesives (HMA), pressure sensitive adhesives (PSA), hot melt pressure sensitive adhesives (HMPSA), and the like. The tacky materials can also include sealants, asphalt and asphalt-containing materials, polymers, polymer-containing materials, as well as low molecular weight oligomers and polymers, high melt flow index materials including polymers, naturally occurring as well as synthetic materials including tackifiers, gum bases, waxes, rubber, rubber-like materials, and organic materials. These materials include those that retain their tack at ambient temperature, possess or develop surface tack properties as a consequence of processing and/or storage, as well as those that can undergo deformation, phase separation, and/or component migration contributing to tack or the development of tack as a consequence of processing and/or storage wherein tack as defined herein includes stickiness.

Owing to the properties of these meltable and processable tacky materials, it has been found that difficulties arise when extruding, pelletizing, drying, and bagging such materials. Such difficulties can arise at any point in the process from beginning to end. Feeding of tacky materials into an extrusion process is but one example of such difficulties. Pelletizing is particularly problematic with tacky materials as is transportation through any piping between processing wherein even slight changes in temperature, change in direction of the piping, constriction of the flow pathway, collision of the pellets formed, flow rate of the transport fluid, and composition of the transport fluid have significant impact due to the tacky nature of the materials. Similarly dewatering and drying processes are subject to agglomeration, occlusion, sticture, and obstruction due to pellet interactions and collisions, for example. Metal surfaces can be problematic throughout the process and can require special treatments especially wherein hang-up points are present. Any junctions where pellet flow pathways are diverted can prove problematic including bifurcated and/or gated pathways, for example. Individual packaging, bulk packaging, packaging materials, and storage conditions including environmental and stacking considerations are important considerations in the successful processing of tacky materials. And finally, equipment considerations are important in overcoming the adhesion and sticture problems as well as volume-related wear in processing such materials.

According to some embodiments, a system for continuously bagging a tacky material includes a feeding section configured to receive a tacky material; a mixing section configured to receive the tacky material from the feeding section and mix, melt, and/or blend the tacky material; a pelletizing section configured to receive the tacky material from the mixing section and pelletize the tacky material; a drying section configured to receive the tacky material from the pelletizing section and dry the pelletized tacky material. The system for continuously bagging a tacky material further provides a pellet diverter valve comprising: an inlet configured to receive an incoming flow of pellets from the drying section; and at least a first and second outlet, each configured to dispense an outgoing flow of pellets; and at least a first and second bagging assembly in communication with at least the first and second outlets, respectively, of the pellet diverter valve, wherein the at least the first and second bagging assemblies alternately receive a specific quantity of pellets from the pellet diverter valve to allow continuous bagging of the pellets.

According to other embodiments, a method for continuously bagging a tacky material includes feeding a tacky material into a feeding section; mixing, melting, and/or blending the tacky material in a mixing section; pelletizing the mixed, melted, and/or blended tacky material in a pelletizing section; drying pellets of the tacky material in a drying section; continuously diverting a specific quantity of the pellets through one of a first and second outlet of a pellet diverter valve; and collecting the specific quantity of pellets in a bag using a bagging assembly, wherein the bagging assembly is located at the first or second outlets of the pellet diverter valve.

According to other embodiments, a continuous bagging assembly device includes a vertical forming tube having an input configured to receive a specific quantity of pellets and an output configured to dispense the specific quantity of pellets; a bagging material placed around and below the forming tube, wherein the bagging material is configured to collect the specific quantity of pellets; and a horizontal sealing mechanism configured to seal the bagging material into individual bags for containing the specific quantity of pellets.

According to other embodiments, a system for continuously bagging tacky materials includes a feeding section configured to receive a material, wherein the feeding section is optionally thermally controlled.

The system can also include a mixing section configured to receive the material from the feeding section and mix, melt, and/or blend the material. The mixing section can include a die having a removable insert with a taper angle that is less than or equal to about 25 degrees. In some cases, the taper angle of the removable insert is less than or equal to about 15 degrees. In other cases, the taper angle of the removable insert is less than or equal to about 10 degrees.

There can be a gap between the removable insert and a body of the die, such that the gap is less than or equal to about 0.010 inches. In some situations, the gap between the removable insert and the die body is less or equal to about 0.005 inches.

In some cases, a face of the removable insert can extend beyond a surface edge of the die body. For example, the face of the removable insert can extend beyond the surface edge of the die body less than or equal to about 0.080 inches. In other situations, the face of the removable insert can extend beyond the surface edge of the die body less than or equal to about 0.060 inches.

In some specific implementations of the system, the taper angle of the removable insert is less or equal to about 10 degrees, a gap between the removable insert and a body of the die is less than or equal to about 0.005 inches, and the face of the removable insert extends beyond a surface edge of the die body is about 0.060 inches to about 0.080 inches.

The die of the mixing section can have a die hole that has a land, which is continuous.

The system can also include a pelletizing section configured to receive the material from the mixing section and pelletize the material. Such a pelletizing section can include a cutter hub that includes a blade angle of less than about 90 degrees, a blade cutting angle that is less than or equal to about 20% less than the blade angle, and a blade traverse angle of about 0 degrees to about 55 degrees. The pelletizing section can also include a transport fluid box that includes an inlet and an outlet to reduce a velocity of transport fluid into and through the transport fluid box. The inlet of the transport fluid box can direct a flow of transport fluid directly across a cutting face of a pelletizing die, and the outlet can reduce any obstruction of pellets leaving the transport fluid box by providing an open area.

The cutter hub of the pelletizing section is capable of being streamlined to have extended hexagonal cross-section. In some cases, the blade angle of the cutter hub can be about 20 degrees to about 60 degrees. Similarly, the blade cutting angle of the cutter hub can be less than or equal to about 15% less than the blade angle. Also, the blade traverse angle can be about 20 degrees to about 55 degrees. In some implementations, the cutter hub has a blade angle of about 30 degrees to about 50 degrees, a blade cutting angle less than or equal to about 15% less than the blade angle, and a blade traverse angle of about 20 degrees to about 55 degrees.

The inlet and outlet of the transport fluid box can facilitate an enhanced flow rate and volume of the transport fluid across the face of the pelletizing die such that an increased volume of transport fluid is present relative to the number of pellets and such that the reduced concentration of pellets is removed from the transport fluid box more efficiently to reduce a likelihood of adhesion, sticture, and agglomeration of the pellets.

The system can also include a system of non-linear transport piping that is downstream of the transport fluid box, such that the non-linear transport piping includes long-radius angles.

The system can also include an agglomerate catcher that is downstream of the pelletizing section, wherein the agglomerate catcher includes an angled agglomerate removal grid, wherein an angle of inclination of the agglomerate removal grid is at least about 0 degrees. The non-linear transport piping can be configured to allow transport of the material from the pelletizing section to the agglomerate catcher. It is possible for the angle of inclination of the angled agglomerate grid to be at least about 20 degrees. In some cases, the angle of inclination of the angled agglomerate grid is at least about 40 degrees. In other cases, the angle of inclination of the angled agglomerate grid is at least about 50 degrees.

The system can also include a defluidizing section that is downstream of the agglomerate catcher. The defluidizing section can include a pellet feed chute that is partially blocked to prevent filtration of the transport fluid from the material. Also, the defluidizing section does not include any obstructive baffles.

The system can further include a drying section, which is configured to receive the material from the defluidizing section and dry the pelletized material. The drying section can include a dryer that itself includes a rotor with rotor blades in an upper portion of the rotor that are at least about 10% narrower than rotor blades in a lower portion of the rotor, and at least two circumferential screens about the rotor such that at least a lowermost screen is a blank. In some situations, the rotor blades in the upper portion of the rotor are at least 20% narrower than the rotor blades in the lower portion of the rotor. Alternatively, the rotor blades in the upper portion of the rotor can be at least 30% narrower than the rotor blades in the lower portion of the rotor.

The system can also include a pellet diverter valve that is downstream of the drying section. The pellet diverter valve can be comprised of an inlet that is configured to receive an incoming flow of pellets from the drying section, a housing, a housing offset, and at least a first and second outlet. The housing and housing offset can be configured such that a diverter flap moves inside the housing into the housing offset to provide an open area through which the pellets traverse, wherein the open area has a cross-sectional area that is no less than the pellet diverter valve inlet. The first and second, and other, outlets are each configured to dispense an outgoing flow of pellets. The diverter flap of the pellet diverter valve can be operated manually, electronically, hydraulically, automatically, and/or electromechanically.

The system can also have at least a first and second bagging assembly in communication with at least the first and second outlets of the pellet diverter valve, respectively. The first and second, and other, bagging assemblies can be configured to alternatingly receive a specific quantity of pellets from the pellet diverter valve to allow continuous bagging of the pellets.

In addition, within the system, a surface treatment can be applied to at least a portion of a surface of a component of the feeding section, mixing section, pelletizing section, transport piping, agglomerate catcher, defluidizing section, drying section, pellet diverter valve, and/or bagging assemblies. The surface treatment can be used to reduce abrasion, erosion, corrosion, wear, and undesirable adhesion and stricture. The surface treatment can include at least two layers such that the surface formed following treatment is three-dimensionally textured. The at least two layers can be formed from at least one layer of a wear-resistant material that is uniformly overcoated with a non-stick polymer that only partially fills the three-dimensional surface texture of the at least one layer of wear-resistant material. For example, the at least one layer of wear-resistant component of the surface treatment can be a ceramic, and/or the non-stick polymer of the surface treatment can be a silicone, fluoropolymer, or a combination thereof.

BRIEF DESCRIPTION OF THE DRAWINGS

FIG. 3 is a schematic illustration of a diverter valve in various flow positions, comprising: FIG. 3a which is a schematic illustration of the exterior of the diverter valve; FIG. 3b which illustrates the diverter valve in the operational position; and FIG. 3c which illustrates the diverter valve in the external purge position.

FIG. 4 is a schematic illustration of the diverter valve with horizontal external purging, comprising: FIG. 4a which is a schematic illustration of a portion of the diverter valve rotated ninety degrees in relation to FIG. 3, for which FIG. 3a is shown, to illustrate the horizontal purge chute; FIG. 4b which is a top view of the diverter valve position illustrating the operational position; FIG. 4c which is a top view of the diverter valve position illustrating the horizontal external purge position directing flow into the horizontal purge chute; and FIG. 4d which is a schematic illustration of a portion of the diverter valve rotated ninety degrees in relation to FIG. 3a to illustrate the horizontal pipe for recycling.

FIG. 6 is a schematic illustration of a one-piece die plate with heating elements in three configurations.

FIG. 7a illustrates the three configurations of the heating element extracted from the die plate.

FIG. 7b illustrates the three configurations of the heating element positionally placed individually in side view.

FIG. 18b is a schematic view of the streamline cutter hub rotated in perspective relative to FIG. 18a.

FIG. 18c is a cross-sectional view of the streamline cutter hub in FIG. 18a.

FIG. 19 is an illustration of cutter blade designs and attachment angles to cutter hubs showing the relative traverse angle of the blade cutting edge to the die face, comprising.

FIG. 27b is a schematic illustration of the reverse view of the prior art pellet diverter valve in FIG. 27a.

DETAILED DESCRIPTION

Figure 1:
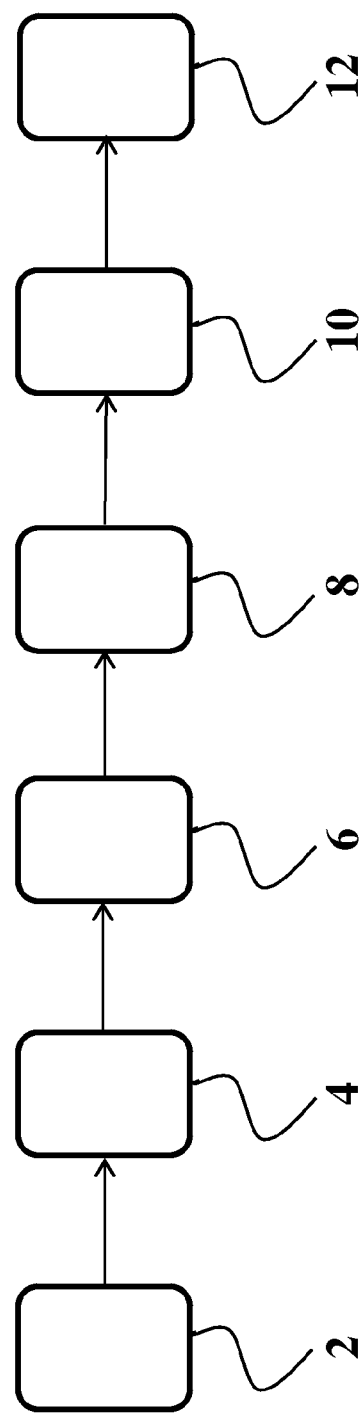
FIG. 1 illustrates a flow chart of a continuous bagging process.

Referring now to the figures, wherein like reference numerals represent like parts throughout the several views, exemplary embodiments of the present invention will be described in detail. Although preferred embodiments of the invention are explained in detail, it is to be understood that other embodiments are possible. Accordingly, it is not intended that the invention is to be limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity. Throughout this description, various components may be identified having specific values or parameters, however these items are provided as exemplary embodiments. Indeed, the exemplary embodiments do not limit the various aspects and concepts of the present invention as many comparable parameters, sizes, ranges, and/or values may be implemented.

The continuous bagging system, shown as a flow chart in FIG. 1, includes at least one feeding or filling section 2 that provides material(s) that can include tacky material(s) into a mixing, melting and/or blending section 4. This mixing section 4 is coupled to a pelletizing section 6 that is subsequently connected via a transport system to a dewatering/drying section 8. Upon exiting the dewatering/drying section 8, pellets pass into and through a pellet diverting section 10 and are subsequently and ultimately fed into a bagging/packaging section 12.

Tacky materials as disclosed herein without intending to be limited can include adhesives such as polyamide adhesives, polyester adhesives, hot melt adhesives (HMA), pressure sensitive adhesives (PSA), hot melt pressure sensitive adhesives (HMPSA), and the like. The tacky materials can also include sealants, asphalt and asphalt-containing materials and formulations, polymers and polymer-containing materials as well as formulations, as well as low molecular weight oligomers and polymers, high melt flow index materials including polymers, naturally occurring as well as synthetic materials including tackifiers, waxes and wax-containing formulations, gum bases and gum base formulations, rubber, rubber-like materials, and organic materials. Examples of tacky rubber and rubber-like materials can include ethylene-propylene copolymers and terpolymers, EPDM rubber, natural rubber, isobutylene-isoprene copolymers, butyl rubber, polyisoprene, poyisobutylene, polybutadiene, halogenated butyl rubber, polychloroprene, polysulfides, poly epoxides and copolymers, polypropylene oxide and copolymers, polepichlorohydrin, chlorinated polyethylene, silicone rubbers, styrene-butadiene copolymers, butadiene-acrylonitrile copolymers, urethane elastomers, halogenated ethylene-propylene copolymers, polyethacrylate including blends of the above as well as plasticized compositions and combinations of the above. These materials include those that retain their tack at ambient temperature, possess or develop surface tack properties as a consequence of processing and/or storage, as well as those that can undergo deformation, phase separation, and/or component migration contributing to tack or the development of tack as a consequence of processing and/or storage wherein tack as defined herein includes stickiness. The tacky materials can also be used as components of other formulations or can be the final product.

An exemplary continuous bagging process for tacky materials generally includes feeding the material(s) that can include tacky material(s) from the feeding or filling section 2 to the mixing, melting, and/or blending section 4 to which can be added additional material(s) that can include tacky material(s) as needed. The material or combined materials are then mixed, melted, and/or blended in at least one vessel that can include one or more extruders alone and in many combinations. The now molten material, preferably uniformly admixed, is extruded through a pelletizer in pelletizing section 6. Following transport, the pellets are sent into and through a dewatering and/or drying device in the dewatering/drying section 8 from which the now dewatered and/or dried pellets pass into and through the pellet diverting section 10. The pellets can be diverted or directed out of the processing, or directed into and through the bagging section 12 for subsequent bagging and/or packaging. The diverted pellets can be discarded, reprocessed and/or used directly, for additional processing and/or for post-processing as needed.

Continuing with FIG. 1, the feeding or filling section 2 can include at least one of manual, gravity, and automated feeders and feeding processes. The material being fed can be solid or liquid and can be delivered by weighing, mass-balance transfer, and/or volumetric processes as are known to those skilled in the art. The feeders can be cooled to temperatures below the tack point of the material to provide proper conveyance for tacky materials as well as below the freezing point for low melting materials for proper solid conveyance. Solid materials can be fed as powders, granules, pellets, particles, and the like. These materials, particularly tacky solid materials, can be coated prior to the feeding process to reduce or eliminate the tack for enhanced feeding.

Alternatively the materials to be fed, including tacky materials, can be melted prior to introduction into the feeders for delivery as a liquid. Such molten materials can be provided by transfer from upstream processes as, for example, from heated storage containers and railroad cars. Drum heaters, both internal and external, can be used to melt materials in drums or similar storage containers as well. These molten materials as well as liquid materials can then be transported to the feeders by feed screw, pumps, or other comparable devices as are known to those skilled in the art. Similarly, liquid materials can be fed by siphoning processes utilizing partial vacuum. This is particularly important for reactive and/or moisture-sensitive materials, for example.

These materials are introduced into the mixing, melting, and/or blending section 4 of FIG. 1. These processes can be accomplished by use of one or more thermally regulated vessels, extruders, and/or static mixers.

Vessels can include mixers containing motor-operated rotors to which are fixedly attached mixing blades that can be propeller or boat-style, ploughshare style, delta style or sigma style including single, double, and multiple configurations. Helical or helical dispersion blades can also be used. Alternatively, ribbon blenders, Banbury-type blenders, horizontal mixers, vertical mixers, planetary mixers, and other equivalent devices can be used as known to those skilled in the art.

Various levels of mixing and shear are achieved by the differing styles of blades and mixer designs. For example, higher shear blades are preferred for components such as rubbers or cross linkable materials and thermally sensitive materials. Energy is introduced into the materials mechanically by the shear as well as thermally by the physical heating process. Propeller style blades are preferred for physical mixing where less or no shear is required to achieve uniformity of blending. Thermal control of the vessel may be achieved electrically, by steam, or by circulation of heat tempering fluids such as oil or water, for example. The vessel chamber can be atmospheric, under vacuum or reduced pressure, as well as purged with air or an inert gas (e.g., nitrogen, argon, or the like).

Mixing, melting and/or blending can also be achieved using at least one single, twin, and/or multiple screw extruder such as a ring extruder. The sections of the screw must feed, mix, and convey the material(s) simultaneously providing sufficient thermal and/or mechanical energy to melt, mix, shear, and/or uniformly disperse the material or materials. The extruder, particularly the twin and multiple screw extruders, can be purged with air or other inert gas such as nitrogen or alternatively can be evacuated at one or more ports to remove gases, volatiles, or other unwanted materials. Multiple feeding and injection ports can be added along the barrel of the screw as required to allow addition of solid or liquid ingredients to the material in process as needed. Configuration of the screw must be satisfactory to achieve an appropriate level of feeding, mixing, melting, blending, and throughput as necessitated by the specific process. The extruder can also be used to cool the material being processed in at least one zone of the extruder to improve or increase viscosity, confer thermal stability, and/or reduce volatility for example.

Liquid or molten materials including formulations from upstream sources including storage areas, vessels, and/or extruders can be pumped into a static mixer for additional mixing and thermal processing. These fluid-like materials are pressurized using a booster pump that can be a centrifugal or positive displacement reciprocating or rotary pump. The rotary pump can be a peristaltic, vane, screw, lobe, progressive cavity, or gear pump. To generate moderate pressures ranging from approximately 150 pounds per square inch (psi) to approximately 500 psi, an open clearance gear pump is preferable, whereas a high precision gear pump would be more appropriate to generate higher pressures in excess of approximately 500 psi.

The pressurized melt can optionally be processed through a coarse filter such as a candle filter, basket filter, or screen changer to remove larger particles, agglomerates, or remaining granular material. Preferably a basket filter of 20 mesh or coarser requiring only moderate pressure is used when coarse filtration is necessitated by the material being processed. When additional filtration or finer particulate filtration is essential to the process, a basket filter and preferably a screen changer can be used. Preferably, a screen changer of 200 mesh or coarser is used, and more preferably a multilayer screen changer of two or more screens is used. Even more preferably, filtration through a multilayer screen changer of two or more screens of differing mesh can be used, and most preferably the multilayer screen changer comprises a series of filters (e.g., 20 mesh, 40 mesh, and 80 mesh filters). Alternatively, the multilayer screen changer can comprise a sandwich of screens such that the finer mesh screen is between two coarser screens, thus providing coarse filtration as well as providing additional structural support to the screen assembly. Exemplary of this is a multilayer screen sandwich comprising a series of filters of 20 mesh, 200 mesh, and 20 mesh. To achieve the most preferable filtration, a gear pump capable of generating pressure ranging from approximately 500 psi to approximately 2000 psi can be used. The screen changer as described hereinabove can be manual, plate, slide plate, or single or dual bolt in design, and can be continuous or discontinuous in operation. The pressure generated must be sufficient to force the melt through the complete filtration process as well as into and through the thermally regulated static mixer.

Figure 2:
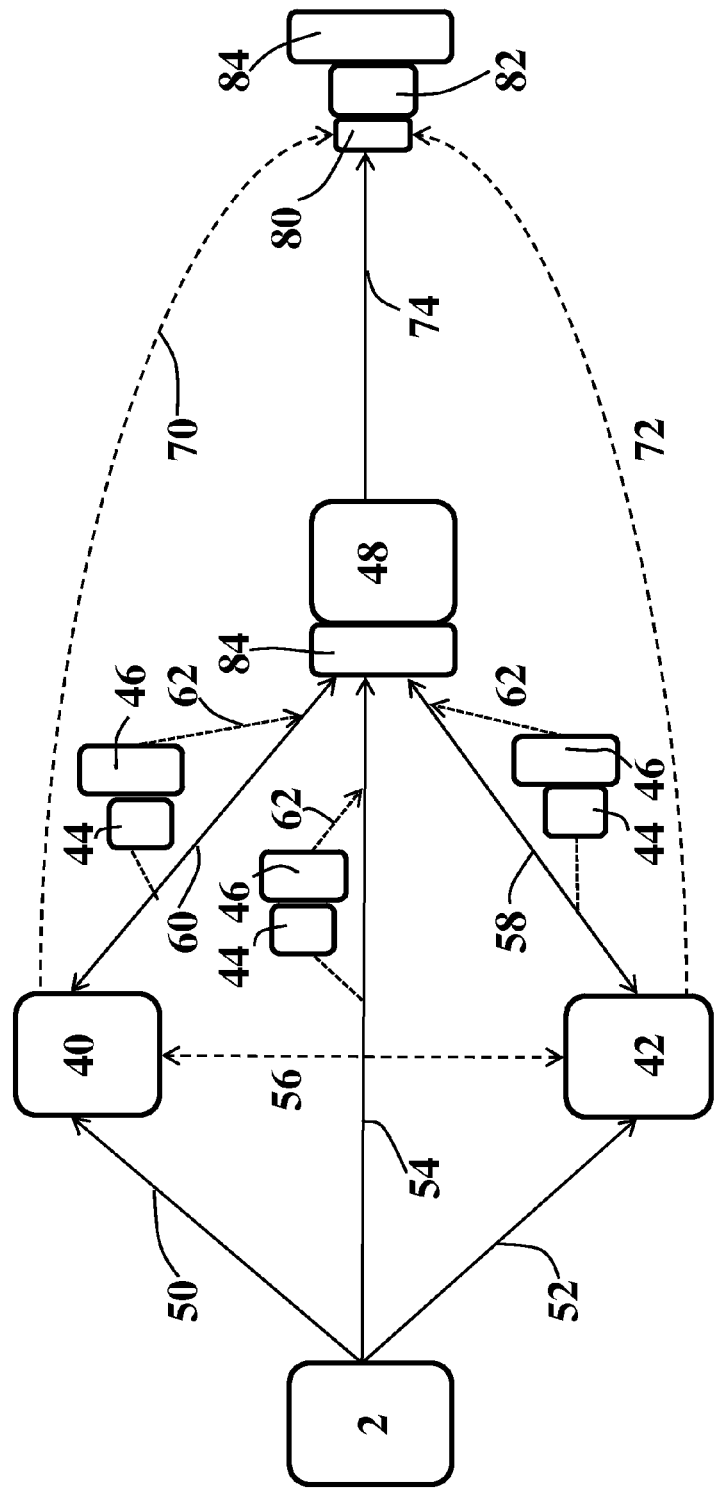
FIG. 2 illustrates a flow chart of the mixing, melting, and/or blending portion of a continuous bagging process.

The mixing, melting, and/or blending section 4 is summarized in the flow chart in FIG. 2. Material can be transferred by the feeding section 2 to the mixing, melting, and/or blending section 4 as indicated by arrow 50 to vessel 40 or as by arrow 52 to extruder 42 or alternatively as shown by arrow 54 to static mixer 48. Additionally and optionally, material can be passed from vessel 40 to extruder 42, or the reverse as indicated by dotted bidirectional arrow 56. Similarly, and optionally, material can be passed from vessel 40 to static mixer 48 or the reverse as indicated by bidirectional arrow 60 with still another alternative being the passage of material from extruder 42 to static mixer 48 and the reverse indicated by bidirectional arrow 58. Monodirectional arrow(s) 62 indicates that material can be processed optionally by at least one pump 44 through at least one filter 46 to provide sufficient pressure to facilitate the flow of material to and through static mixer 48 regardless of the source (i.e., whether the source is the feeding section 2, vessel 40, and/or extruder 42). Therefore, a multiplicity of pathways and equipment are illustrated in FIG. 2 as detailed above. It should be understood that the molten material can also be transported (e.g., by pumping) to a remote storage area or facility and maintained until such time as it is ready to be further processed.

Dotted line 70 indicates that material from the vessel 40 can be passed to the pelletizing section 6 detailed below. Similarly, material from extruder 42 can be passed as shown by dotted line 72 to pelletizing section 6, and material from static mixer 48 can be passed according to dotted line 74 to pelletizing section 6. An optional pump 80 as well as an optional filter 82 can be used to facilitate the passage of materials from the mixing, melting, and/or blending section 4 to pelletizing section 6 into and through at least one diverter valve 84. Another optional diverter valve 84 can be placed between filter 46 and static mixer 48 as illustrated in FIG. 2. Pump 44 and pump 80 can be the same or different, for example, according to the above description wherein pump 80 preferably is capable of generating pressures greater than approximately 500 psi (and more preferably approximately 500 psi to approximately 2000 psi and greater as necessitated by the material being processed). Filter 46 and filter 82 can be the same or different, wherein filter 82 preferably is a multilayer screen changer of two or more screens of differing mesh size, and is most preferably a multilayer screen changer comprising a series of filters. The mixing, melting, and/or blending section 4 is also described in commonly-assigned International Patent Application Publication No. WO 2007/064580, which is incorporated herein by reference as if fully set forth below.

The optional diverter valve 84 in FIG. 2, and illustrated in detail in FIG. 3, is connected directly or by a suitable transition to either the outlet of the final component of the mixing, melting, and/or blending section 4 or to the outlet of optional pump 80 or optional filter 82. The outlet of the appropriate component or transition is attached to inlet 88 of diverter valve 84 illustrated in FIG. 3a. Both inlet 88 and outlet 90 are coupled to housing 86. Two or more modes of flow are available through diverter valve 84 as illustrated in FIGS. 3b and 3c.

In the operational flow mode shown in FIG. 3b, flow proceeds through inlet 88 into inlet tube 92, which is in open communication with flow pathway 94 through the movable diverter bolt 96. Flow progresses through flow pathway 94, which is in open communication with outlet tube 98 and outlet 90. One or more modal pathways may be so constructed in positionally differing arrangements so as to allow one or more flow pathways to be available.

Similarly, in the "divert flow" mode illustrated in FIG. 3c, flow proceeds through inlet 88 into inlet tube 92, which is in open communication with flow diversion pathway 100 through the movable diverter bolt 96. Flow progresses through flow diversion pathway 100, which is in open communication with diversion outlet 102. Molten, liquid, or extruded material can be diverted or removed from the process via this pathway.

FIG. 4 illustrates the diverter valve 84 as designed to allow side-discharge of the diverted flow. FIG. 4a illustrates a 90° rotation of the diverter valve 84 from FIG. 3a to show the attachment of diverter chute 104 to the housing 86. Alternatively, the diverted flow can pass through diversion pipe 106 similarly attached to housing 86 as illustrated in FIG. 4d. As in FIG. 3, two or more modes of flow are available through the diverter valve 84 as illustrated in FIGS. 4b and 4c. In the operation flow mode shown in FIG. 4b, flow proceeds through inlet 88 into inlet tube 92, which is in open communication with flow pathway 108 through the movable diverter bolt 110. Flow progresses through flow pathway 108, which is in open communication with outlet tube 98 and outlet 90. One or more modal pathways can be so constructed in positionally differing arrangement so as to allow one or more than one flow pathway to be available.

Similarly, in the divert flow mode illustrated in FIG. 4c, flow proceeds through inlet 88 into inlet tube 92, which is in open communication with flow diversion pathway 112 through the movable diverter bolt 110. Flow progresses through flow diversion pathway 112, which is in open communication with diversion outlet tube 114. Molten, liquid, or extruded material can be diverted, as for recycling for example, or removed from the process via this pathway. The diverted flow passes through diversion outlet tube 114 to and through outlet 116 to which can be connected diverter chute 104 or diversion pipe 106 as illustrated in FIGS. 4a and 4d, respectively.

Inlet tube 92 can be decreasingly tapered as shown in FIGS. 3b, 3c, 4b, and 4c. Alternatively, inlet tube 92 is cylindrical in diameter, which is dimensionally consistent with either the outlet from the mixing, melting, and/or blending section 4 (FIG. 2) or an appropriate optional transition. The continuous diameter is preferable to avoid any dimensional reduction of the flow pathway wherein adhesion or sticture of tacky materials can be processed. Without intending to be bound by any theory, reduction of the flow pathway can result in increased pressure and/or shear that can manifest itself as undesirable increased temperature with subsequent reduction of viscosity. Diversion outlet tube 114 can be cylindrical, increasingly tapered, and the like, but cannot be decreasingly tapered for the reasons stated hereinabove. Outlet tube 98 is increasingly tapered to outlet 90 so as to dimensionally accommodate components of the pelletization section 6 as described below.

The components in sections 2 and 4 of FIGS. 1 and 2 including vessels, extruders, gear pumps, screen changes, diverter valves (FIGS. 3 and 4), and static mixers can be surface treated and/or coated. Nitriding, carbonitriding, electrolytic plating, electroless plating, thermal hardening, flame spray techniques, and sintering techniques are exemplary surface treatment and coating techniques. By way of illustration, International Patent Application Publication No. WO 2009/059020, which is incorporated herein by reference in its entirety as if fully set forth below, describes such techniques.

Figure 5:
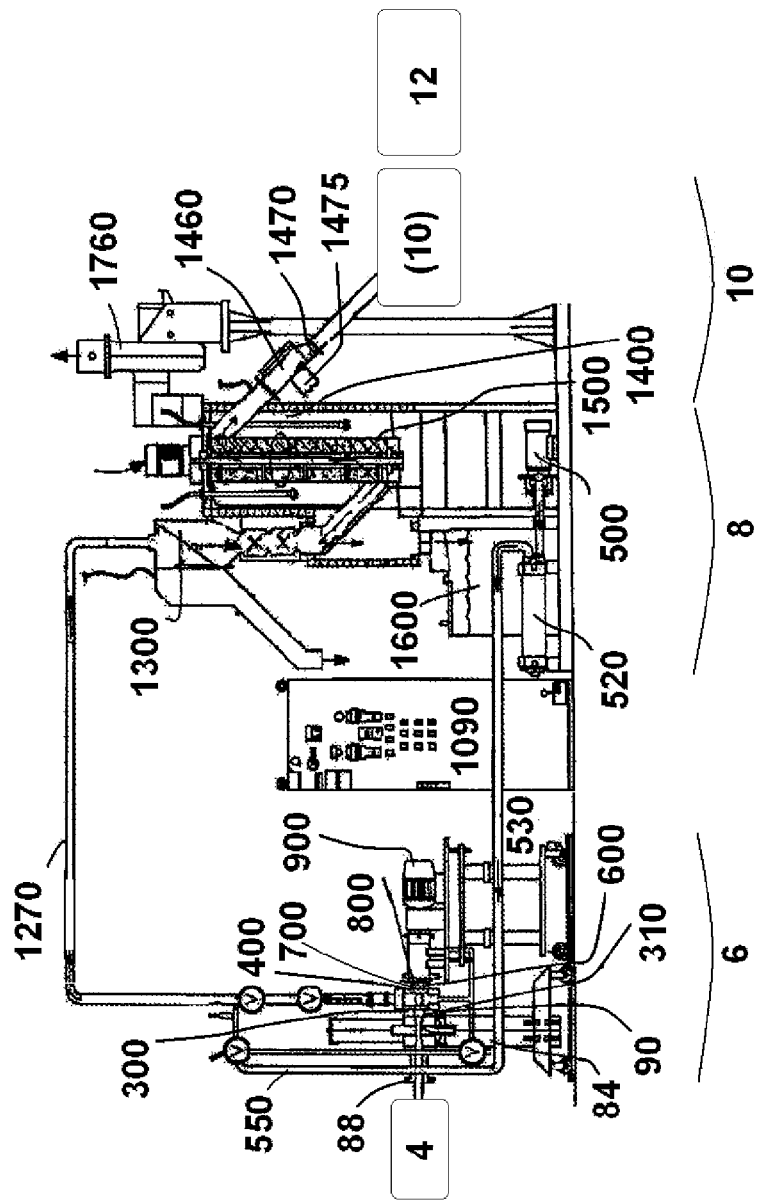
FIG. 5 is a schematic illustration of the pelletizing section and dewatering and/or drying section between the mixing, melting, and/or blending section and the pellet diverting and bagging/packaging sections of the present invention.

Turning now to FIG. 5, and following from FIGS. 1 and 2, the mixing, melting, and/or blending section 4 is connected to the optional diverter valve 84 at inlet 88. The diverter valve in turn is coupled through outlet 90 to the inlet 310 of die 300 with details illustrated in FIGS. 6, 7a, 7b, 8, and 9.

The die 300 in FIG. 6 is a single-body style die, including a nose cone 322 attached to die body 320 into which are fitted heating elements 330 and through which are bored multiple die holes 340 that vary in number and orientation pattern. The die holes 340 preferably have a diameter of less than or equal to about 3.5 millimeters (mm). The die holes 340 can be have many designs, including increasing taper, decreasing taper, cylindrical, and the like, and combinations thereof. Segments of the die holes 340 can vary in length as necessitated by the process and materials. Preferably, the die holes 340 are placed singularly or collectively in groups or pods in one or more concentric rings as determined by the diameter of the outlet 90 of the diverter valve 84, which is coupled thereto.

Heating elements 330 can be a cartridge or coil type element, and can be of sufficient length inside the die body 320 to remain outside the circumference of the die holes (e.g., as illustrated in FIG. 6 and detailed in FIGS. 7a and 7b as configuration 1). The heating elements 330 can extend into and near the center of the die body without passing the center in length (e.g., configuration 2 in FIGS. 7a and 7b), or can extend past the center in length but not of sufficient length to contact the ring of die holes diametrically opposed, (e.g., configuration 3 in FIGS. 7a and 7b). Positioning of the die holes will vary as would be readily recognized by those skilled in the art to accommodate the appropriate configuration of the heating elements 330, and one or more lengths or designs of the heating elements 330 can be implemented.

Figures 8, 8A:
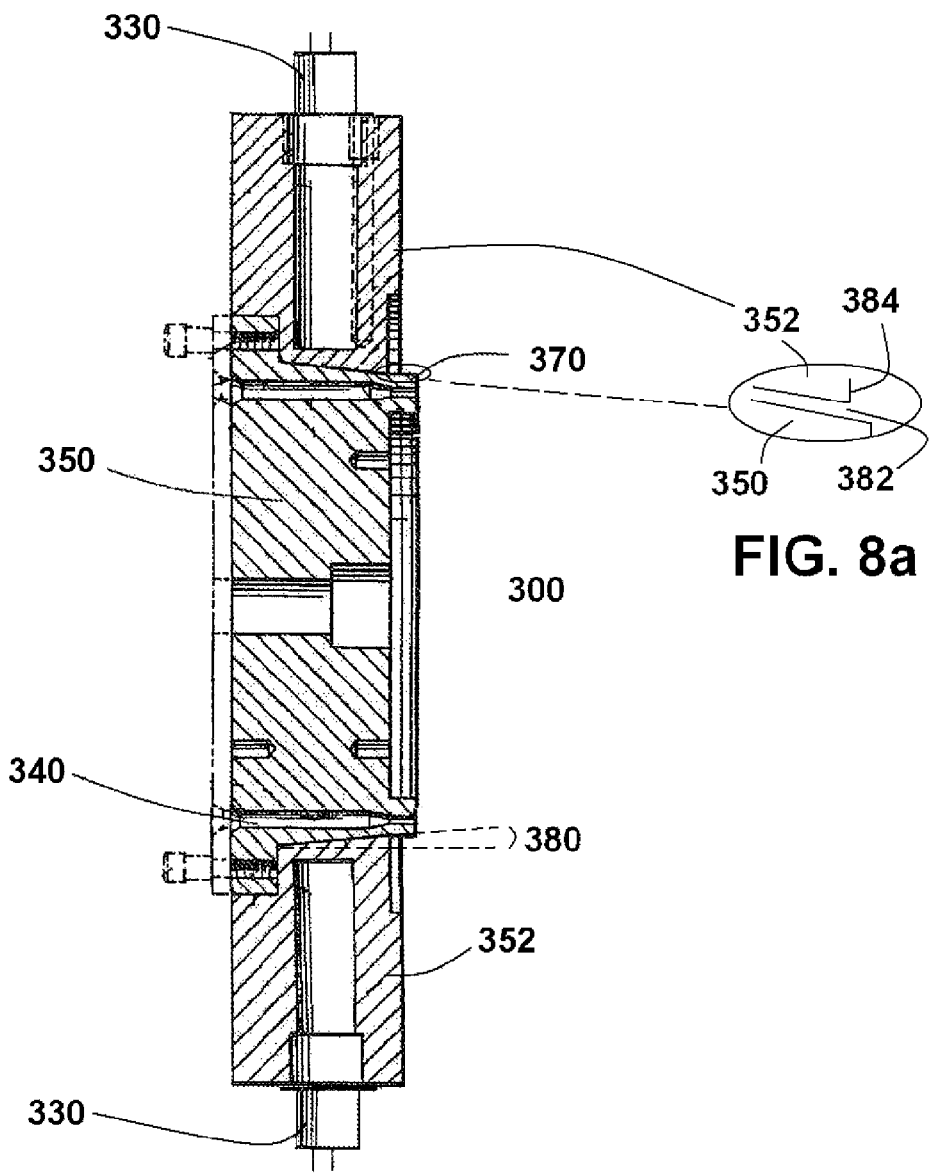
FIG. 8 is a schematic illustration of a removable-center die.
FIG. 8a is an expanded view illustration of a portion of the removable-center die of FIG. 8.

A preferred design of die 300 is illustrated in FIG. 8 in that the die body is of a removable center or insert configuration. The heating elements 330 are of a cartridge or coil configuration and are inserted into the outer die body component 352 whereby they are constrained in length to suitably fit within the confines of the outer die body component 352. The die holes 340 are contained within removable insert 350 and are variable in design, dimension, and placement as detailed above.

For tacky materials, for example, the lands of the die holes 340 preferably are continuous, or are significantly continuous in diameter such that following the introduction of the molten material into the die hole it is not subjected to additional compression and/or shear as would be introduced by any decrease in diameter of the land of that die hole and thus does not experience a reduction in viscosity due to any such differences. The positioning of the die holes 340, particularly for tacky materials, is also of significant importance in that spacing needs to be such that on extrusion and pelletization, as described hereinbelow, the pellets being formed do not readily come in contact with each other, thus avoiding unwanted adhesion, sticture, and/or agglomeration of those pellets. Such positioning must further take into consideration any die swell that the material experiences as a consequence of its progress through, and egress from, the die holes. The removable insert 350 can be coupled to outer die body component 352 using ordinary mechanisms as would be understood by those skilled in the art.

In a more preferred configuration for die 300 as illustrated in FIG. 8 and expanded in detail in FIG. 8a, the taper angle 370 that the edge of the removable insert 350 makes relative to a perpendicular line drawn from one of the parallel faces of the removable insert 350 is less than approximately 25°. As the control of the thermal uniformity of the die becomes more significant, as in low viscosity tacky materials, for example, where subtle to minor temperature changes can make large differences in that viscosity, the taper angle 380 is preferably approximately 15° or less, and more preferably less than approximately 10°. As the taper angle is decreased, it was found to be surprising that withdrawal of the removable insert 350 becomes increasingly difficult such that a gap 382 between the removable insert 350 and the outer die body component 352 becomes necessary. Preferably, the gap 382 is less than approximately 0.010 inches (approximately 0.25 mm), and more preferably the gap 382 is less than approximately 0.005 inches (approximately 0.13 mm). It was also surprising that a slight extension 384 of the removable insert 350 past the surface edge of the outer die body component 352 enhanced the quality of the material being pelletized. The extension 384 is preferably less than approximately 0.080 inches (approximately 2.0 mm), and more preferably is in a range from approximately 0.060 inches to approximately 0.080 inches (approximately 1.5 mm to approximately 2.0 mm). In a still more preferred configuration, as by way of example for highly tacky and low viscosity materials, the removable insert 350 has a taper angle 380 of less than approximately 10°, and a gap 382 of less than approximately 0.005 inches (approximately 0.13 mm), and an extension 384 in a range from approximately 0.060 inches to approximately 0.080 inches (approximately 1.5 mm to approximately 2.0 mm).

Similarly, where viscosity or tack is less significant or where the control of the thermal uniformity in this particular processing step is not important, the taper angle 380 can be increased to greater than approximately 25° and preferably can be in a range from approximately 25° to approximately 45° and greater. As this thermal control is now not as rigorous, the gap 382 necessary for the lower taper angle is no longer significant and the extension 384 is no longer of requisite importance.

Figure 9:
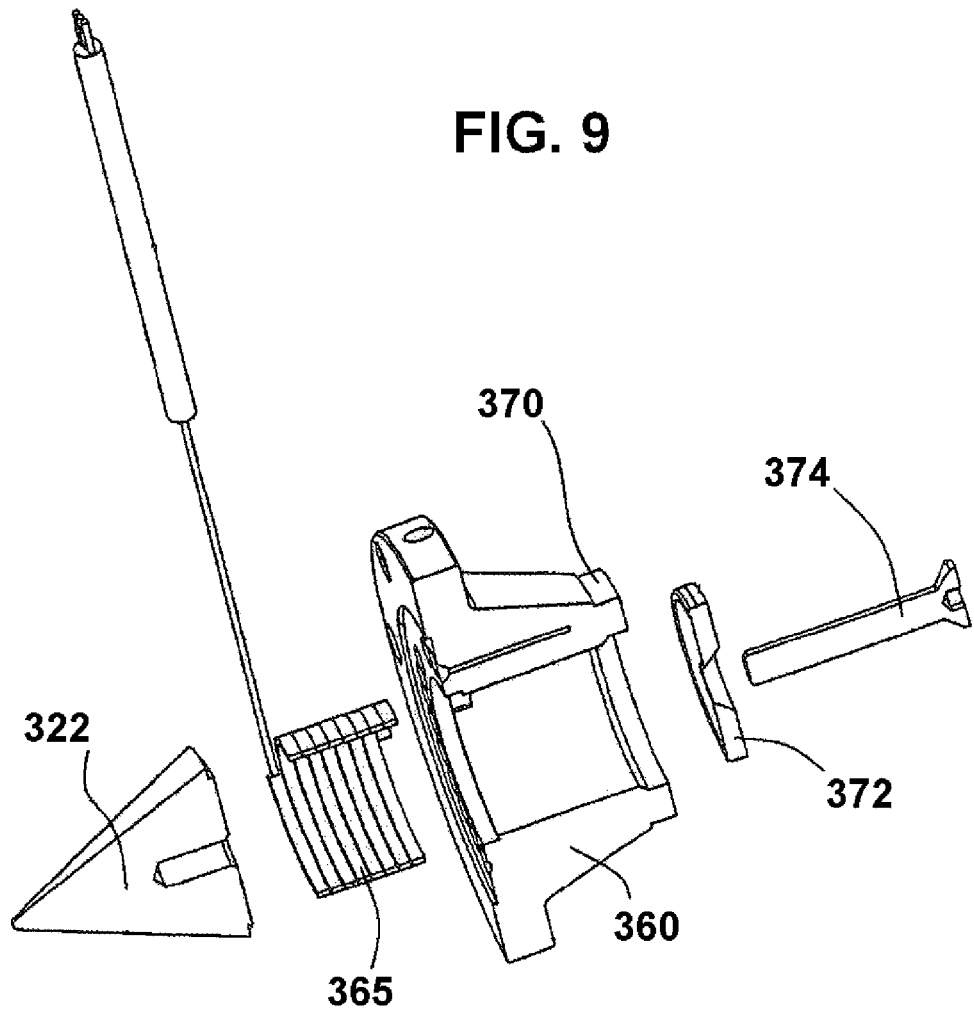
FIG. 9 is an expanded view illustration of the components of a removable center-heated die.

FIG. 9 shows an alternative design of die 300 in that the die body is of a removable center or insert configuration with multiple heating zones for enhanced heating efficiency and more facile thermal transfer to the molten or liquid materials as they pass through the die holes 340. The outer die body component, not shown, is comparable to that described for FIG. 8. The heated removable insert 360 of the alternative design has an open center to which is fitted a heating element 365, preferably a coiled heating element, that can be thermally controlled in common with other heating elements in the outer die body component or more preferably, is autonomously regulated thermally thus allowing multizone heating capacity within the die 300.

The die 300 in all configurations (FIGS. 6, 8, and 9) can contain an appropriate hardface 370 for a cutting surface, as illustrated in FIG. 9, that is preferably an abrasion resistant, wear resistant, and, where required, corrosion resistant material and through which pass the die holes 340 for extrusion of the molten or liquid extrudate. For example, tungsten carbide, titanium carbide, and the like, and ceramics or mixtures thereof, either alone or in combination, are but a few example materials for hardface applications. Similarly, the die 300 in all configurations (FIGS. 6, 8, and 9) can be insulated die designs, as described in International Patent Application Publication No. WO 2010/019667, which incorporated by reference in its entirety as if fully set forth herein.

In addition, the die 300 can undergo surface treatments, surface finishing, polishing, or hard surfacing (e.g., nickel phosphide, chrome plating, nitriding, or a comparable physical or chemical treatment) to provide additional protection to the die body.

A bolting mechanism for the nose cone 322 is illustrated in FIG. 9. A cover plate 372 is positionally attached by bolt 374 to the face of the die body 320, removable insert 350, or heated removable insert 360, as shown in FIGS. 6, 8, and 9, respectively. The cover plate 372 can be less than or at least equal to the height dimension of the hardface 370. Alternatively, a gasket material or other materials for sealing of the cover plate 372 can be used as desired.

Diverter valve outlet 90 is comprised of an inner bore that is tapered diametrically and conically in increasing diameter to create a chamber continuously and proportionately larger than nose cone 322 that inserts therein. The volume of the resulting chamber allows unobstructed flow of the polymeric material or other molten or liquid material to flow from the diverter valve 84 into the die hole 340. Alternatively, an adapter or transition can be attached to diverter valve outlet 90, which is accordingly tapered to accommodate the nose cone 322.

Figure 10:
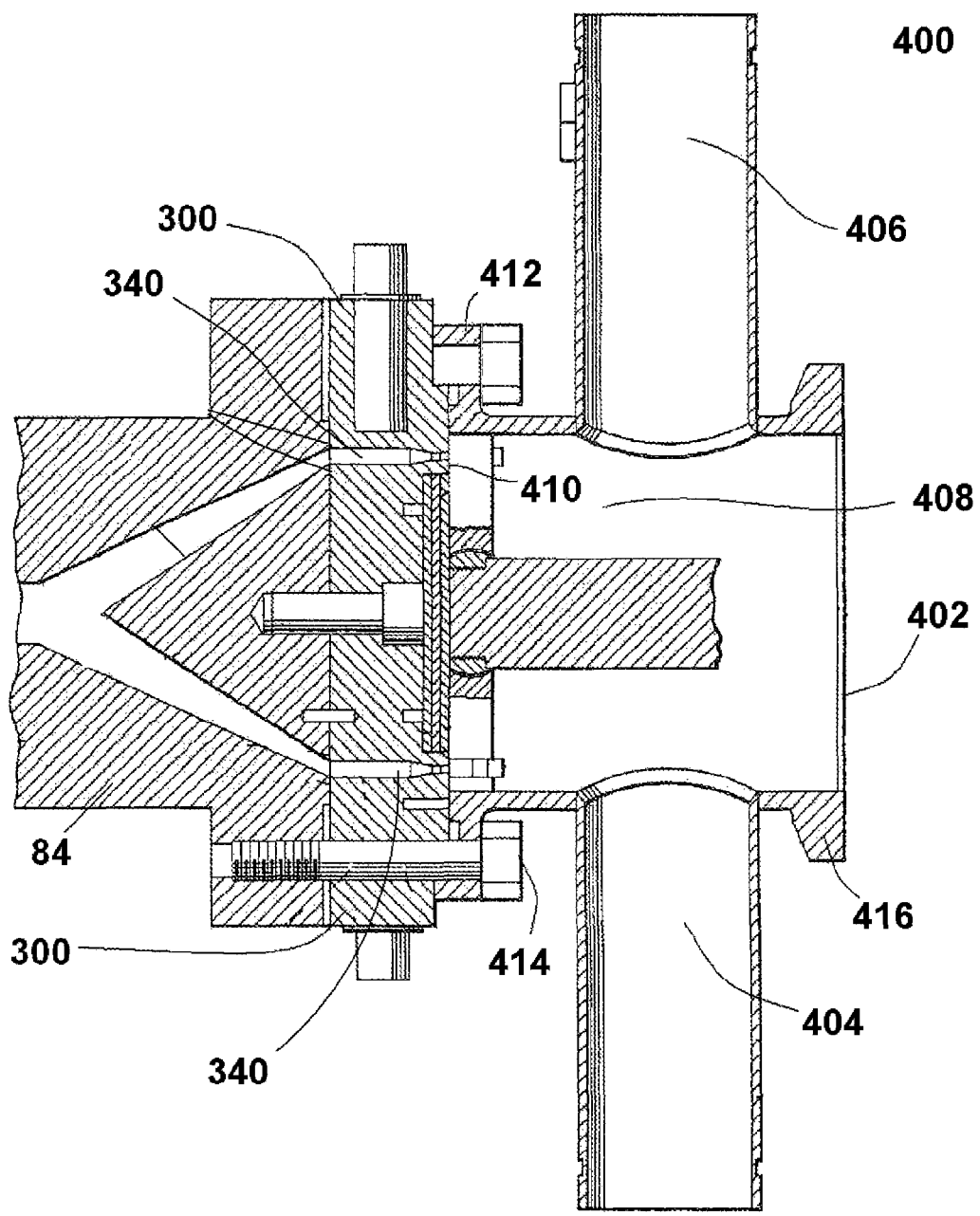
FIG. 10 is a schematic illustration of a die body with transport fluid box.
Figure 11:
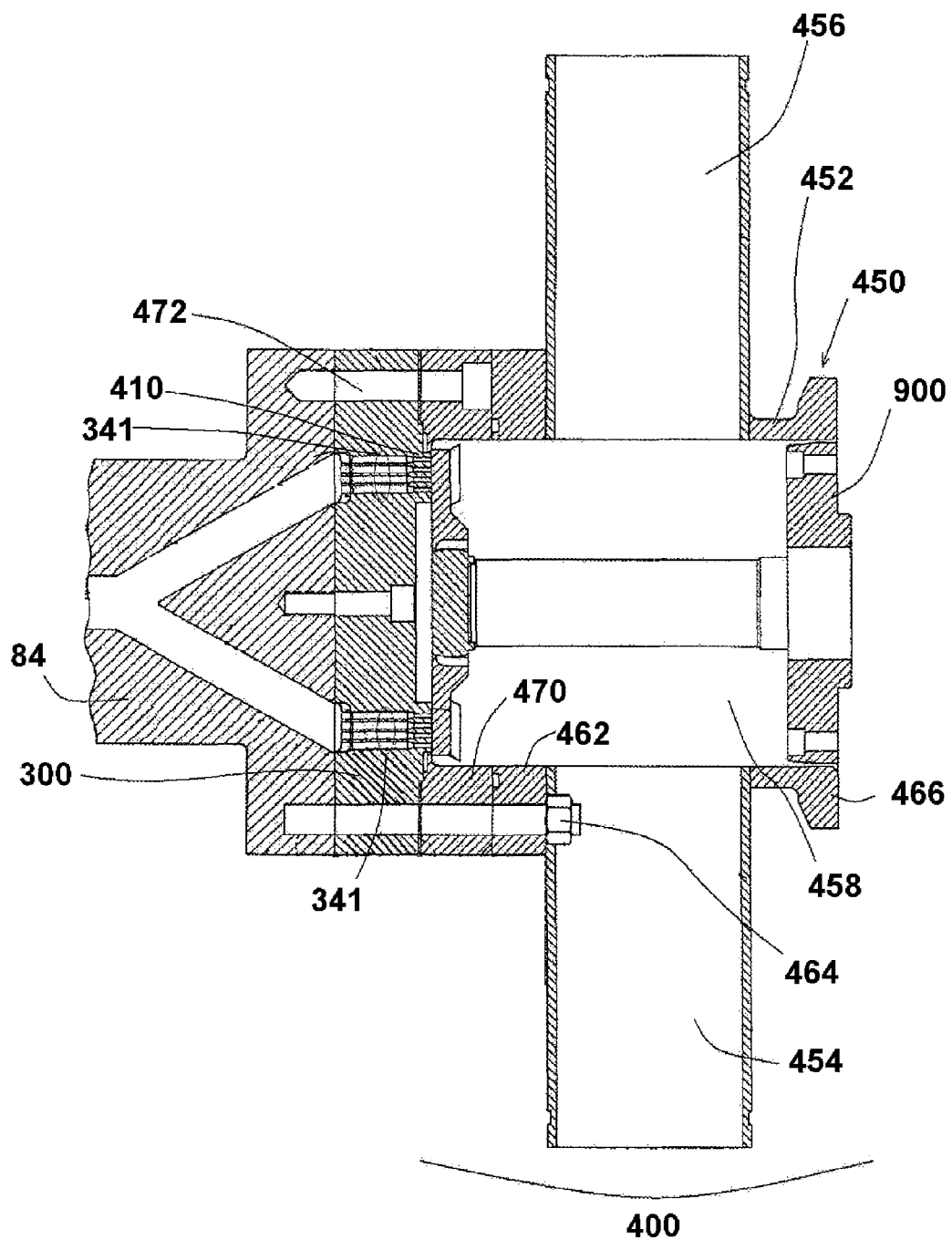
FIG. 11 is a schematic illustration of a die body and two-piece transport fluid box.

The diverter valve outlet 90 and alternative adapter, nose cone 322, and die body 320 in FIGS. 6, 10, and 11, the removable insert 350 of FIG. 8, and the heated removable insert 360 of FIG. 9, can be made of carbon steel, thermally hardened carbon steel, stainless steel (including martensitic and austenitic grades), thermally hardened and precipitation-hardened stainless steel, or nickel to improve resistance to abrasion, erosion, corrosion, and wear. Nitriding, carbonitriding, electrolytic plating and electroless plating techniques can be used to enhance these resistance properties.

To provide a smooth surface for die holes 340 in FIGS. 6, 8, and 10 to reduce erratics from manufacturing processes such as bore marks, the die holes 340 can undergo treatment by electron discharge machining (EDM) utilizing a wire that is circumferentially rotated about the die hole. This can enhance surface smoothness, improve uniformity of the die hole geometry, and controllably and uniformly increase the die hole diameter. Alternatively, high-velocity abrasive and polishing grits of uniformly fine grain size can be passed through the die holes to effect improved smoothness within the die hole. Additionally, inserts (e.g., made from a fluoropolymer, tungsten carbide, other ceramics, and the like) to reduce abrasion and adhesion can be placed into the lands of die holes 340. Other surface treatments for improvement of surface properties, enhancement of corrosion and abrasion resistance, and improvement of wear can be used.

Referring once again to FIG. 5, the die 300 is coupled to transport fluid box 400 as shown in FIGS. 10 and 11, and detailed in FIGS. 12, 13*a*, 13*b*, and 13*c*. FIG. 10 illustrates a configuration of a one-piece transport fluid box 400 that comprises a housing 402 to which is connected inlet pipe 404 and outlet pipe 406, which have a similar diameter and geometry, are diametrically opposed to each other, and are coupled to a rectangular, square, cylindrical or other geometrically open cutting chamber 408. The open cutting chamber 408 surrounds, and is of sufficient diameter to completely encompass, the die face 410 (representationally equivalent to the surface of hardface 370 in FIGS. 6, 8, and 9). Housing 402 has mounting flange 412 through which a plurality of mounting bolts 414 pass to sealingly attach the transport fluid box 400 and die 300 to diverter valve 84. Flange 416 on housing 402 allows attachment to the pelletizer 900 (see FIG. 5) as is detailed below. Components that are free to rotate within the cutting chamber 408 are described below.

Similarly, FIG. 11 illustrates a two-piece configuration of transport fluid 400 comprising a main body 450 with a housing 452 to which is connected inlet pipe 454 and outlet pipe 456, which are of similar diameter and geometry, are diametrically opposed to each other, and are coupled to a rectangular, square, cylindrical, or other geometrically open cutting chamber 458. The open cutting chamber 458 surrounds, and is of sufficient diameter to completely encompass, the die face 410 (representationally equivalent to the surface of hardface 370 in FIGS. 6, 8, and 9). Housing 452 has mounting flange 462 through which a plurality of mounting bolts or studs 464 pass. Mounting flange 462 sealingly attaches to adapter ring 470 of comparable diameter, both inside and outside dimensions, through which pass a plurality of countersink bolts 472. Mounting bolts or studs 464 and countersink bolts 472 are preferably positioned in an alternating manner, and sealingly attach the components the complete transport fluid box 400 and die 300 to diverter valve 84. Flange 466 on housing 452 of the main body 450 allows attachment to the pelletizer 900 (see FIG. 5) as is detailed below. Components that are free to rotate within the cutting chamber 408 in FIG. 10 and/or cutting chamber 458 in FIG. 11 are described below. Separate attachment of the adapter ring 470 to and through the die 300 allows the main body 450 to be removed for cleaning or maintenance while leaving die body 300 sealingly attached to diverter valve 84.

Figure 12:
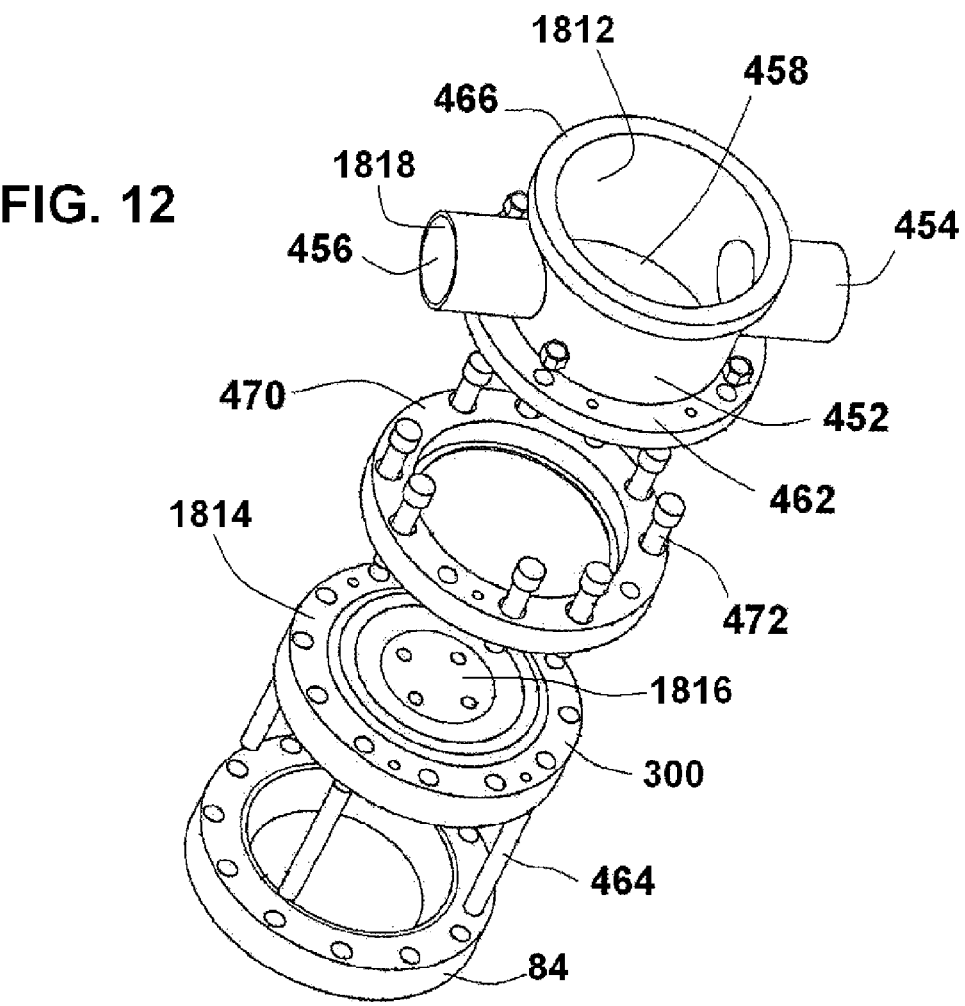
FIG. 12 is an expanded view illustration of a comparative two-piece transport fluid box.
Figure 13:
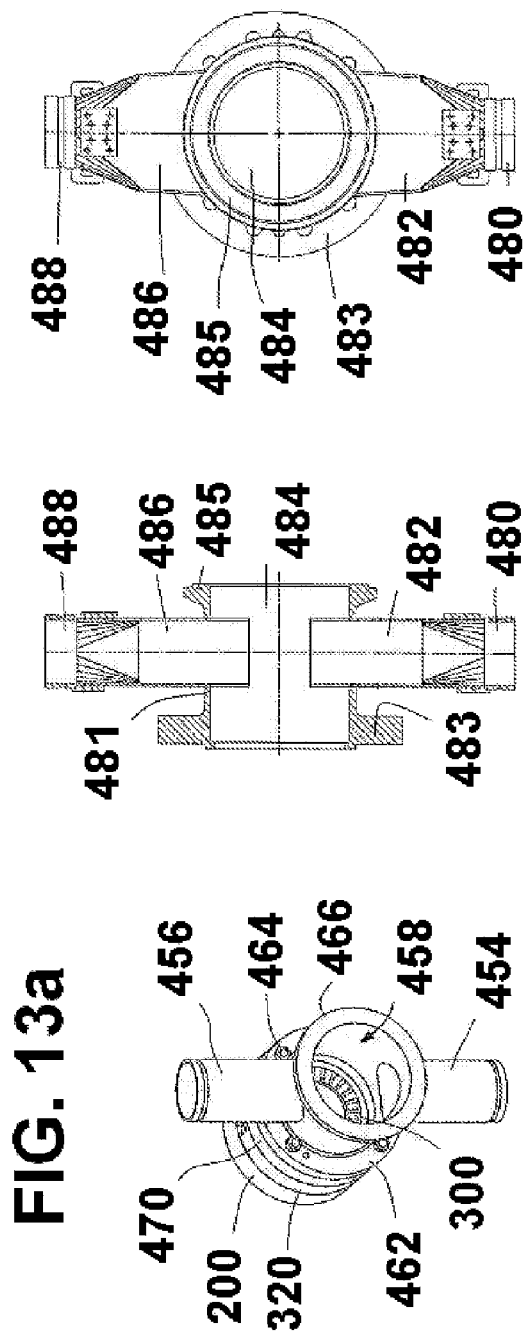
FIG. 13a is a schematic illustration of a complete assembly of a comparative two-piece transport fluid box.
FIG. 13b is a cross-sectional illustration of an alternative transport fluid box inlet and outlet design.
FIG. 13c is a schematic face-view illustration of the alternative transport fluid box inlet and outlet design of FIG. 13b.

An exploded view of the two-piece configuration of transport fluid box 400 is illustrated in FIG. 12, with a complete assembly illustrated in FIG. 13. Reference numbers are retained to be consistent wherein similar parts have similar numbers in FIGS. 11, 12, and 13*a*.

FIGS. 13*b* and 13*c* illustrate an alternative design for the transport fluid box inlet and outlet in that inlet 480 is fixedly attached to a rectangular or square inlet tube 482 that taperingly increases along its length as it approaches the housing 481 to which it is attachedly connected and within which is cutting chamber 484. Similarly, attached to housing 481 and diametrically opposed to inlet tube 482 is rectangular or square outlet tube 486 that taperingly decreases along its length to outlet 488 to which it is fixedly attached. Flange 483 and flange 485 in both FIGS. 13*b* and 13*c* compare in design and purpose to flanges 462 and 466 in FIG. 13*a*.

FIGS. 13*a*, 13*b*, and 13*c* illustrate the preferred diametrically opposed inlets and outlets. Alternatively, the inlets, 454 and 480, and outlets, 456 and 488, can be located at an angle from 20° to the preferred 180° relative to, and defined by the position, of outlet to inlet, and can be opposingly or staggeringly attached to housing 481. Dimensions of the inlet and outlet can be the same or different, and the inlet and outlet can be similar or different in design. Preferably the inlet and outlet so identified are of similar dimension and design, and are diametrically opposed.

Returning to FIG. 12, for conventional surface treatments to reduce abrasion, erosion, corrosion, wear, and undesirable adhesion and sticture, the inner surface 1812 of flange 466 and the lumens 1818 of inlet pipe 454 and outlet pipe 456 can be nitrided, carbonitrided, sintered, can undergo high velocity air and fuel modified thermal treatments, and/or can be electrolytically plated. The exterior surface 1814 and exposed surface 1816 of die body 320 can be treated similarly. It is understood that variations illustrated in FIGS. 10, 11, 12, 13*a*, 13*b*, and 13*c* can be treated similarly. Other surface treatments for improvement of surface properties, enhancement of corrosion and abrasion resistance, improvement of wear, improvement of wear, and/or reduction of clumping, agglomeration, and/or sticture can be used as well.

For tacky materials, it is preferred to use a larger diameter inlet pipe 404 and larger outlet pipe 406 (FIG. 10) or larger inlet pipe 454 and larger outlet pipe 456 (FIGS. 12 and 13*a*) or larger inlet tube 482 and larger outlet tube 486 (FIGS. 13*b* and 13*c*) for transport fluid box 400 than would be expected by those skilled in the art. The larger inlet pipes or tubes occupy a larger portion of the respective housings placing them in closer proximity to the die face 410, FIGS. 10 and 11, and facilitate more direct access of the transport fluid entering the transport fluid box 400 directly to the face of the die. The larger outlet pipes or tubes provide more open area for the pellet/transport fluid slurry to be removed from the actual chamber 408 and 458 (FIGS. 10 and 11, respectively) of the transport fluid box 400. The greater open area also reduces the likelihood of pellet collisions potentially leading to agglomeration, adhesion, and sticture. The increased diameters of the inlets and outlets offer additional options regarding volume in that the transport fluid flow rate, as one option, can remain the same as that through the more typical size inlets and outlets, thus reducing the turbulence the pellets are subjected to in the transport fluid box 400. Alternatively, the transport fluid flow rate can be increased proportionately to the increase in the diameter of the inlet and outlet, thus increasing the effective volume of transport fluid in relation to the number of pellets for the same tacky material throughput rate while maintaining the effective turbulence introduced at approximately the same level as would be experienced with the lower diameter inlets and outlets. As a third alternative, the larger diameter inlets and outlets allow a higher transport fluid flow rate facilitating both a greater proportionate volume of transport fluid relative to the pellets, as well as providing higher velocity of that transport fluid into and through the transport fluid box 400, effectively removing the pellets from the cutting chamber more quickly.

Alternatively, the respective inlet pipes can be of smaller diameter than the outlet pipes. For tacky materials it is preferred not to have the outlets smaller in diameter than the respective inlets as this leads to more turbulence, increased likelihood of pellet collisions, and constriction of the open area through which the pellets can leave the cutting chamber.

Once again returning to FIG. 5, pelletizer 900 is shown in the non-operational open position. Coupled to the pelletizer is flow guide 800, and cutter hub 600 with cutter blades 700.

Upon operation of the equipment, pelletizer 900 is moved into position such that it can be attached to flange 416 of the one-piece configuration of transport fluid box 400 or flange 466 on the main body 450 of the two-piece configuration of transport fluid box 400, as detailed in FIGS. 10 and 11, respectively. Attachment is most preferably made using quick disconnects, but can be through many mechanisms. In the operating configuration, the cutter hub 600 and cutter blades 700 freely rotate within the cutting chamber 408 (FIG. 10) or 458 (FIG. 11). Details of all illustrated components are contained within the ensuing discussions.

Figure 14:
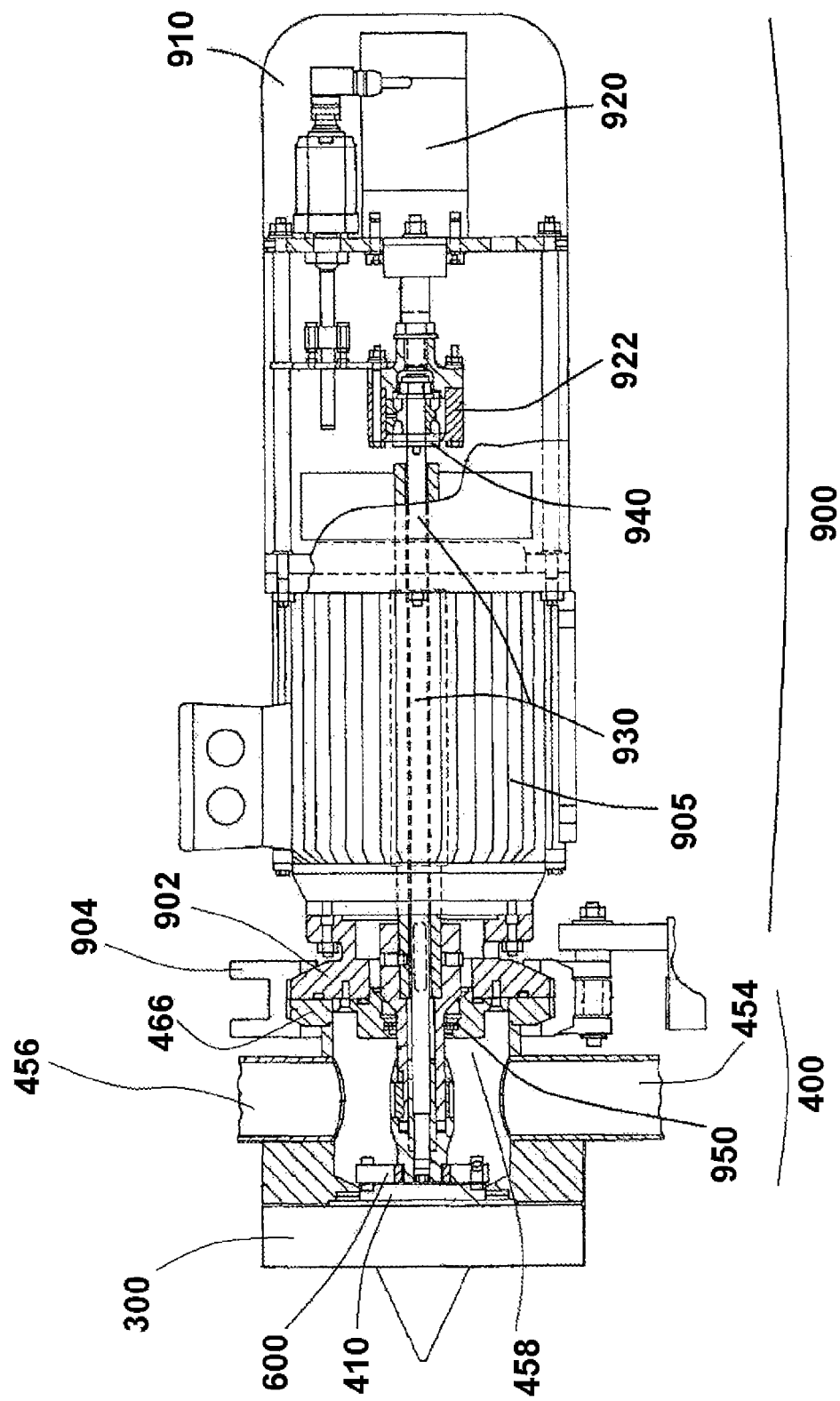
FIG. 14 is a schematic illustration of a pelletizer with attached transport fluid box showing the die.

The pelletizer 900 is shown diagrammatically in FIG. 14 and can be positionally adjustable in terms of cutter hub 600 relative to die face 410. FIG. 14 represents the pelletizer 900 in operational position wherein it is sealingly attached via pelletizer flange 902 to transport fluid box flange 466, tightly held by removable quick disconnect clamp 904, for example. Positional adjustment of the pelletizer can be achieved manually, using a spring-loaded mechanism, hydraulically, pneumatically, electromechanically, or the like, or by combinations of these mechanisms acting cumulatively in one direction or opposingly in counter-direction of forces applied to insure appropriateness of position as necessitated to achieve even wear, increased longevity, avoidance of undue extrusion leading to melt wrap around the cutter hub or the die face 410, and consistency of the pelletized product. For tacky materials, manual and electromechanical adjustment of the pelletizer position is preferred. In a more preferred design, the hydraulic-pneumatic mechanism detailed in FIG. 14 is comprised of a motor 905, housing 910, and contains hydraulic cylinder 920 engagedly attached to coupling 922. A rotor shaft 930 connects coupling 922 to the cutter hub 600 at the die face 410 and passes through thrust bearing 940 and sealing mechanism and preferably a mechanical sealing mechanism 950 in fluid contact with cutting chamber 458 of transport fluid box 400. Inlet pipe 454 and outlet pipe 456 indicate flow direction of fluids, preferably water, into the cutting chamber 458, admixture of fluids and pellets in the cutting chamber 458, and, subsequently, flow of the pellet slurry formed away from the cutter hub 600 as well as die face 410 and out of the cutting chamber 458.

Figure 15:
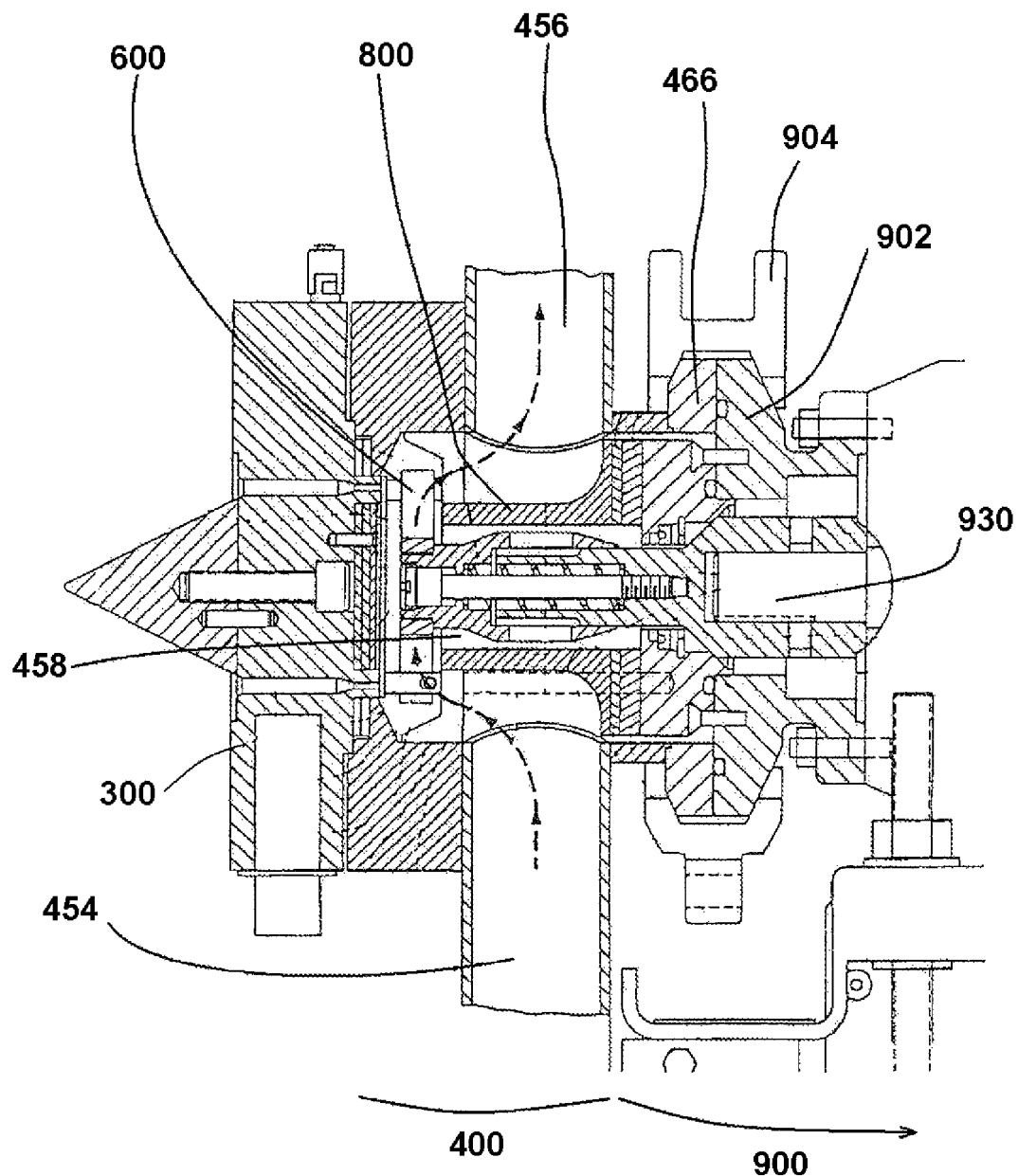
FIG. 15 is a schematic illustration of a die attached to a transport fluid box containing a flow guide.
Figure 16A:
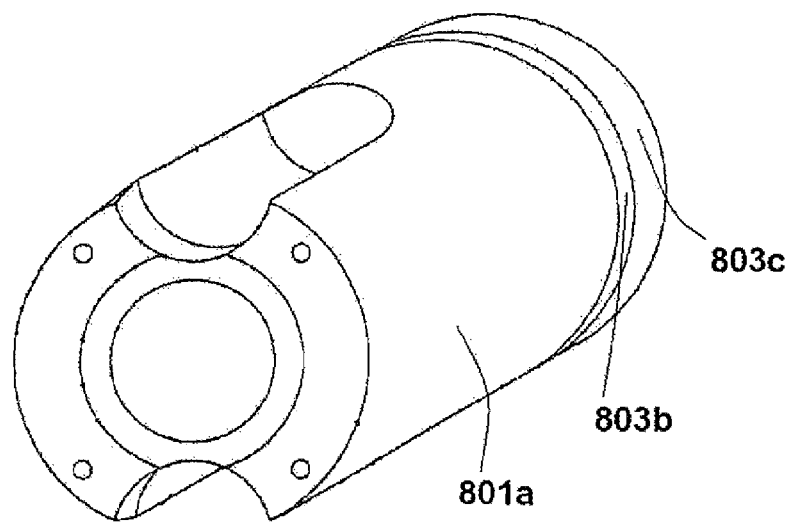
FIG. 16a is a schematic illustration of a comparative flow guide.
Figure 16B:
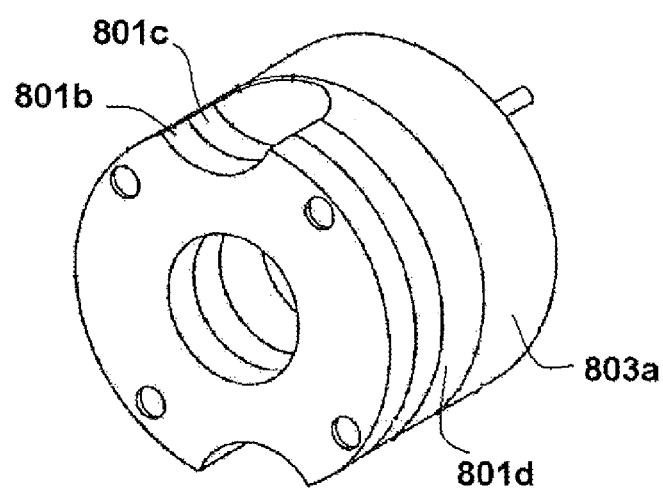
FIG. 16b is a schematic illustration of a second configuration of a comparative flow guide.

To increase fluid velocity through the cutting chamber 458, improve pellet quality, reduce freeze off, avoid wrapping of melt around die face 410, generate or increase head pressure, and improve pellet geometry, FIG. 15 illustrates a configuration in which an optional flow guide 800 can be positioned in the cutting chamber 458 to effectively reduce the fluid volume of that region. The die 300, transport fluid box 400, and pelletizer 900, shown only partially, are positionally the same as in FIG. 14. The hollow shaft rotor preferably is attached to cutter hub 600 in cutting chamber 458 with appropriate inlet pipe 454 and outlet pipe 456 as previously described. The pelletizer 900 is sealingly and removably attached to the transport fluid 400 through use of quick disconnect clamp 904 on pelletizer flange 902 and transport fluid box flange 466 as before. FIGS. 16a and 16b show two exemplary configurations for flow guide 800, in which sections can be of similar or different segmental length having consistent outside diameter that is less than the diameter of cutting chamber 458 and can be varied in accordance with the requisite diminution of volume desired in that cutting chamber 458. Flow guide spacer sections 803 can be uniform circumferentially and diametrically as indicated by the single spacer 803a, or multiple spacers 803b and 803c, but can vary in segmental length and are not limited in number. To direct and/or restrict flow, flow directing segments 801 (e.g., shown as a single segment 801a or multiple segments 801b, 801c, and 801d) are modified by longitudinally extending grooves that are arcuate in transverse configuration with the deepest grooved section positioned proximal to the cutter hub 600.

Figure 17:
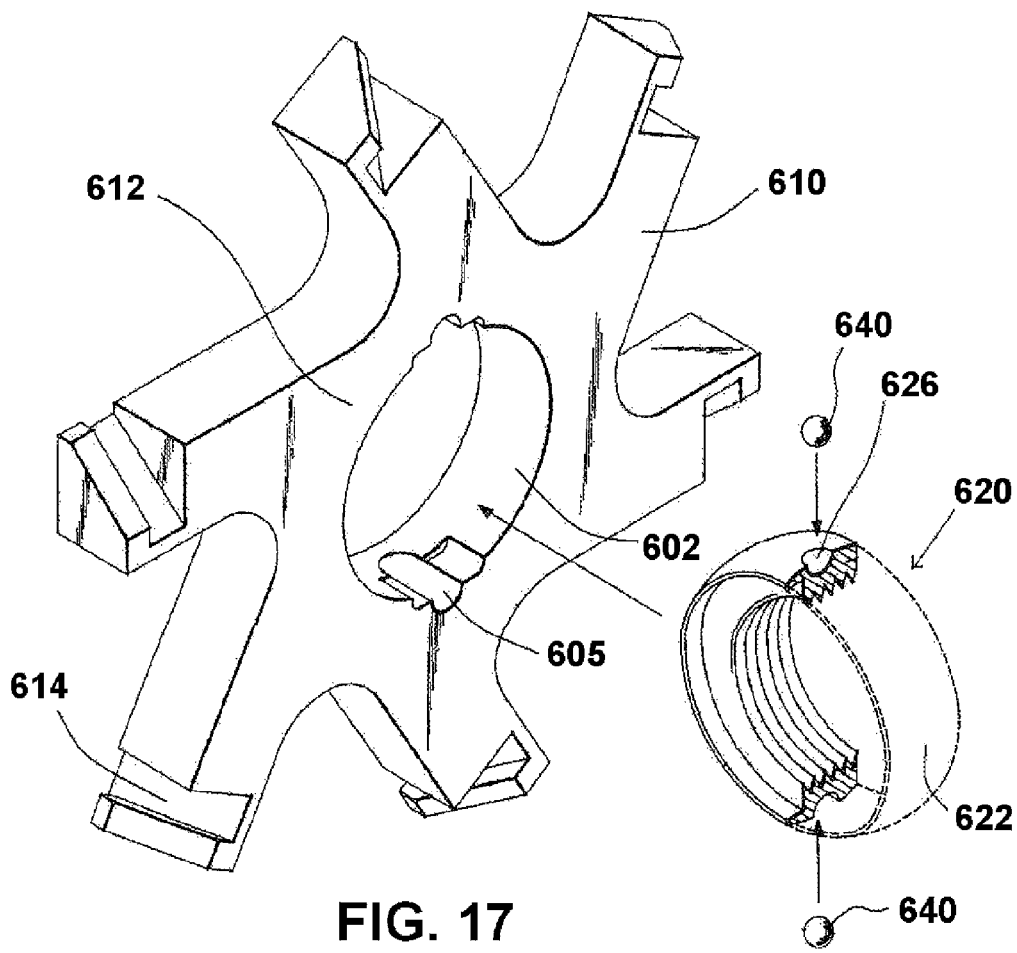
FIG. 17 is a schematic illustration of a comparative flexible cutter hub with exploded view of flexible hub component.

Continuing with FIG. 14, cutter hub 600 is attached by screwing onto the threaded end of the rotor shaft 930 of pelletizer 900. The cutter hub 600 can be rigidly mounted to the rotor shaft 930 and can contain a number of cutter arms 610 in balanced proportion placed circumferentially about the cutter hub 600 as illustrated in FIG. 17. Alternatively, the cutter hub 600 is flexibly attached to rotor shaft 930 using an adapter 620 in which the adapter 620 is attachedly and threadedly connected to rotor shaft 930. Adapter 620 has a partial spherical outer surface 622 matching a similar partial spherical inner surface bore 602 in the cutter hub 600. Diametrically opposed to, and recessed into, the partial spherical inner surface bore 602 are longitudinal recesses 605 that extend to the edge of the cutter hub 600, and into these recesses 605 fit ball 640. Similarly diametrical recesses 626 for ball 640 are located on adapter 620, which is oriented such that longitudinal recess 605 and diametrical recess 626 align to interlockingly affix balls 640 once adapter 620 is inserted orthogonally into position and rotated to a position parallel to cutter hub 600. This allows free oscillation of the cutter hub 600 about the diametrically positioned balls 640 on adapter 620 to rotor shaft 930 that permits rotational self-alignment of the cutter hub 600.

Figure 18A:
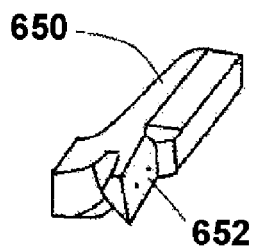
FIG. 18a is a schematic view of a portion of a streamline cutter hub.
Figure 18B:
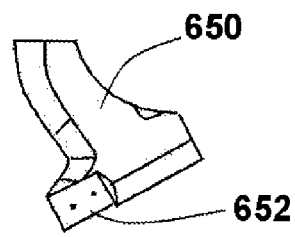
Figure 18C:
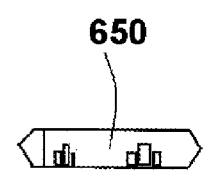

The cutter arms 610 and body of cutter hub 612 can be square or rectangular in cross-section as shown in FIG. 17, or can be more streamlined for tacky materials to give an extended hexagonal cross-section as illustrated in FIG. 18c. FIGS. 18a and 18b show segments of streamline cutter hub 650. Cutter blades are fixedly attached by screw or similar mechanism at flattened angular groove 614, shown in FIG. 17, or at flattened angular notch 652, shown in FIGS. 18a and 18b.

FIG. 19 illustrates various angularly inclined positions and shapes of the cutter blades 750. The blade angle 755 can vary from approximately 0° to approximately 90° and greater, as seen in FIGS. 19a, 19b, and 19c, relative to die hard face 370, FIG. 10, with a blade angle 755 of ranging from approximately 20° to approximately 60° preferred, and a more preferred blade angle 755 of approximately 30° to approximately 50°. The blade cutting edge 760 can be square, beveled, or angled, and can be at a blade cutting angle 765 of 0° to 90°, preferably at a blade cutting angle 765 less than or equal to approximately 20% less than the blade angle 755, and more preferably approximately at a blade cutting angle 765 less than or equal to approximately 15% less than the blade angle 755. FIG. 19d illustrates a portion of die face 410 and die hole 340 across which passes cutter blade 750 with blade cutting edge 760 passing rotationally across die hole 340 at a traverse angle 775 that can range from approximately 0° to approximate 55° and greater. Preferably the traverse angle 775 ranges from approximately 20° to approximately 55°. Most preferably, for tacky materials, the preferred blade angle 755 ranges from approximately 30° to approximately 50° with the blade cutting angle 765 preferably less than 15% smaller than the preferred blade angle 755 such that the blade cutting edge 760 passes across die face 410 at a traverse angle ranging from approximately 20° to approximately 55°.

Figure 19A:
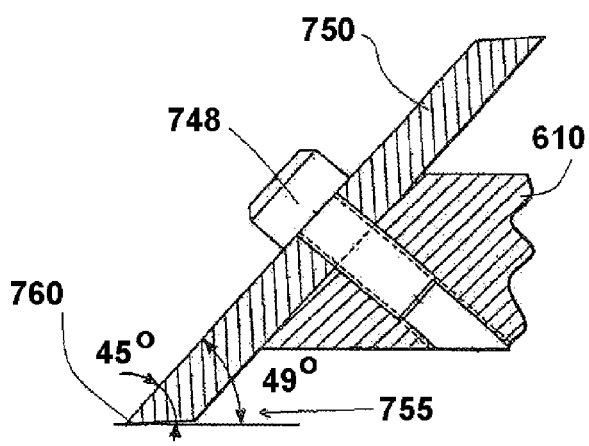
FIG. 19a which is a schematic illustration of a comparative cutter hub with attached normal angle blade.
Figure 19B:
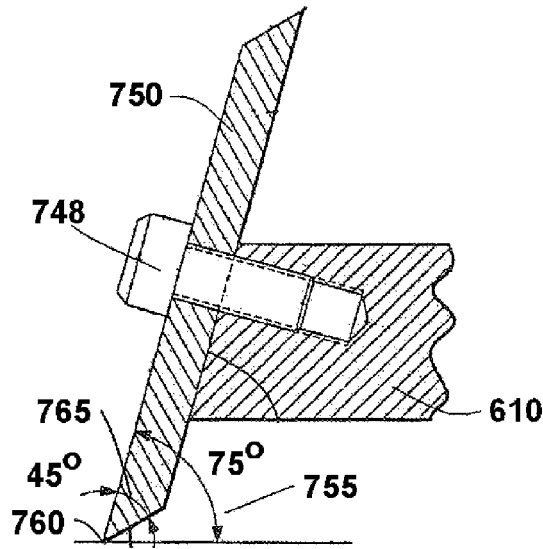
FIG. 19b which is a schematic illustration of a steep angle cutter hub with attached blade.
Figure 19C:
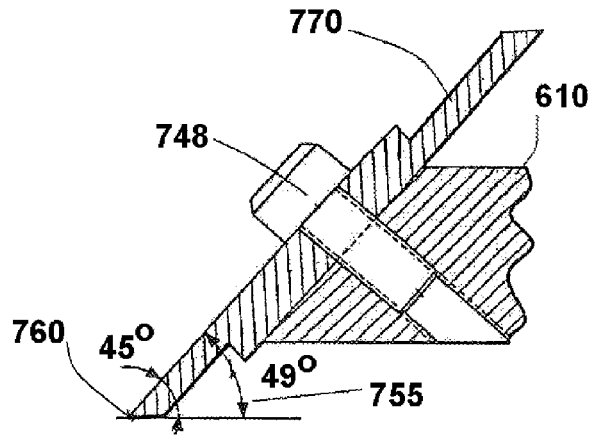
FIG. 19c which is a schematic illustration of a cutter hub with attached reduced thickness blade at normal angle.
Figure 19D:
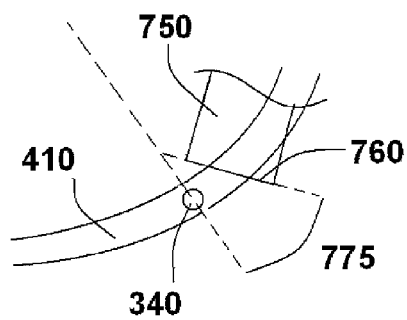
FIG. 19d which is a partial top view schematic illustration of a cutter blade traversing across a die face and die hole.

Alternatively, is a reduced thickness blade 770, as illustrated in FIG. 19c, that can be similarly attached, similarly angled, and with comparable blade cutting angles and preferences as described above. The cutter blade 750 and reduced thickness blade can also be reduced in length such that the upper end of the blade is of sufficient length to provide attachment by screw 748 but does not extend significantly above the uppermost surface of cutter arms 610.

The cutter blade 750 and reduced thickness blade 770 can be formed from tool steel, stainless steel, nickel and nickel alloys, metal-ceramic composites, ceramics, metal or metal carbide composites, carbides, vanadium hardened steel, suitably hardened plastic, or other comparably durable material, and can be further annealed and hardened as is well known to those skilled in the art. Wear-resistance, corrosion resistance, durability, wear lifetime, chemical resistance, and abrasion resistance are some of the important concepts influencing the utility of a particular blade relative to the formulation being pelletized. Blade dimensions of length, width, and thickness as well as number of blades used relationally with cutter hub design are not limited within the scope of the present invention.

Additionally, surface treatments to reduce abrasion, erosion, corrosion, wear, and undesirable adhesion and sticture can be applied to various components of the pelletizing section 6 (FIG. 1) as disclosed in commonly-assigned International Patent Application Publication No. WO 2009/059020, which is incorporated by reference in its entirety as if fully set forth below. Such treatments can include nitriding, carbonitriding, sintering, high velocity air and fuel modified thermal treatments, and electrolytic plating. In addition, flame spray, thermal spray, plasma treatment, electroless nickel dispersion treatments, and electrolytic plasma treatments, can be utilized.

Other surface treatments for improvement of surface properties, enhancement of corrosion and abrasion resistance, improvement of wear, and/or reduction of clumping, agglomeration, and/or sticture can be used too.

FIG. 5 illustrates the relative position of the bypass loop 550. Transport fluids, including water, for use in the bypass loop 550 and pellet transportation is obtained from reservoir 1600 or other sources, and is transported toward the transport fluid box 400 through pump 500 that can be of a design and/or configuration to provide sufficient fluid flow into and through the optional heat exchanger 520 and transport pipe 530 to and into bypass loop 550. The heat exchanger 520 similarly can be of a design of suitable capacity to maintain the temperature of the water or other transport fluid at a temperature appropriately suitable to maintain the temperature of the pellets being formed such that pellet geometry, throughput, and pellet quality are satisfactory without tailing, and where wrap-around of molten plastic on the cutting face, agglomeration of pellets, cavitation, and/or accumulation of pellets in the transport fluid box or waterbox are maximally avoided. Temperatures and flow rates as well as composition of the transport fluid will vary with the material or formulation being processed. Transport fluid temperatures are preferably maintained at least approximately 20° C. below the melting temperature of the polymer, and preferably are maintained at a temperature of at least approximately 30° C. to approximately 100° C. below the melt temperature. For tacky materials the transport fluid temperatures preferably are maintained at a temperature ranging from approximately 0° C. to approximately 35° C.

Additionally processing aids, flow modifiers, surface modifiers, coatings, surface treatments including antistatic agents and various additives known to those skilled in the art can be accommodated in the transport fluid. Piping, valving, and bypass components should be of suitable construction to withstand the temperature, chemical composition, abrasivity, corrosivity, and/or any pressure requisite to the proper transport of the pellet-transport fluid mixture. Any pressure required by the system is determined by the vertical and horizontal transport distance, pressure level needed to suppress unwanted volatilization of components or premature expansion, pellet-transport fluid slurry flow through valving, coarse screening, ancillary process and/or monitoring equipment. Pellet-to-transport fluid ratios should similarly be of varying proportions to be satisfactorily effective in eliminating or alleviating the above-mention complicating circumstances (e.g., pellet accumulation, flow blockage or obstruction, and agglomeration). Piping diameter and distances required are determined by the material throughput, thus the flow rate and pellet-to-transport fluid ratio, and time required to achieve an appropriate level of cooling and/or solidification of the pellets to avoid undesirable volatilization and/or premature expansion. Valving, gauges, or other processing and monitoring equipment should be of sufficient flow and pressure rating as well as of sufficient throughpass diameter to avoid undue blockage, obstruction, or otherwise alter the process leading to additional and undesirable pressure generation or process occlusion. Transport fluid and additive composition should be compatible with the components of the pellet formulation and should not be readily absorbed into or adsorbed onto any of the components in that formulation. Excess transport fluid and/or additives should be readily removable from the pellets by such methods as rinsing, aspiration, evaporation, dewatering, solvent removal, filtration, or a similar technique understood by those skilled in the art.

Pump 500 and heat exchanger 520 in FIG. 5 can be prone to abrasion, erosion, corrosion, and wear as well, particularly from by-products of the pelletization process, and components can optionally be surface treated utilizing nitriding, carbonitriding, sintering, high velocity air and fuel modified thermal treatments, and electrolytic plating. In addition, flame spray, thermal spray, plasma treatment, electroless nickel dispersion treatments, and electrolytic plasma treatments, singly and in combinations thereof can be utilized.

Figure 20:
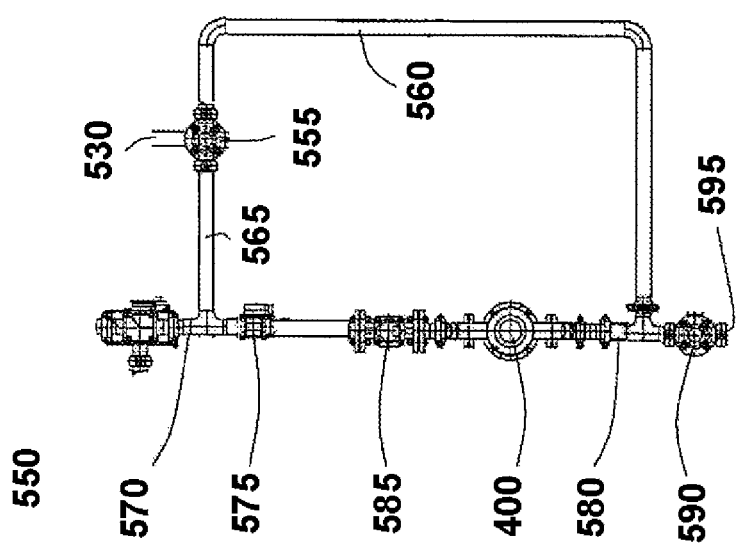
FIG. 20 is a schematic illustration of a bypass loop.

The standard bypass loop 550, as illustrated in FIG. 20, allows the transport fluid, preferably water, from inlet pipe 530 to enter three-way valve 555 and be redirected into the bypass flow or toward the transport fluid box 400. To bypass the transport fluid box 400, the transport fluid is directed by three-way valve 555 into and through bypass pipe 565 into outlet pipe 570. To achieve this, blocking valve 575 is closed. Alternatively, to allow water to flow to and through the transport fluid box 400, the three-way valve 555 is directed to allow flow into and through pipe 560 and into pipe 580 with blocking valve 575 open and with drain valve 590 closed. Transport fluid proceeds into and through transport fluid box 400 and transports pellets into and through sight glass 585 through blocking valve 575 and into outlet pipe 570 for downstream processing as described below. To drain the system and allow cleaning or maintenance of the transport fluid box 400 or die hardface 370, or to replace any of the die 320 components, three-way valve 555 directs flow into and through pipe 565 and into outlet pipe 570. With blocking valve 575 now closed and drain valve 590 open, the transport fluid remaining entrapped below 575, in components 585, 400, 560, and 580 drains out drain 595 for recycling or disposal.

Referring once again to FIG. 5, the pellets that are sufficiently solidified for processing are transported to the dewatering/drying section 8 (FIG. 1) via pipe 1270 to and through an agglomerate catcher/defluidizing unit 1300 and into the drying unit 1400, subsequently exiting the dryer for additional processing as described below. These pipes can be manufactured to form short radius and long radius right angles, or alternatively can be bent to form short radius and long radius sweep angles or curves, which are used preferential for applications involving tacky materials to reduce the likelihood of adhesion, sticture, and agglomeration. Without intending to be bound by theory, it is anticipated that induced stresses can be introduced by such manipulations potentially leading to increased likelihood of wear-related failures due to abrasion, erosion, and/or corrosion, for example. Thus abrasion, erosion, corrosion, wear, and undesirable adhesion and sticture can be problematic in transport piping and treatments including nitriding, carbonitriding, sintering, electrolytic plating, electroless plating, thermal hardening, plasma treatments, extrusion, rotational molding or "rotolining," slush molding, and combinations thereof can be utilized to improve the resistance to wear-related processes and to reduce adhesion and sticture. Other surface treatments for improvement of surface properties, enhancement of corrosion and abrasion resistance, improvement of wear, and/or reduction of clumping, agglomeration, and/or sticture can be used as well.

Figure 21:
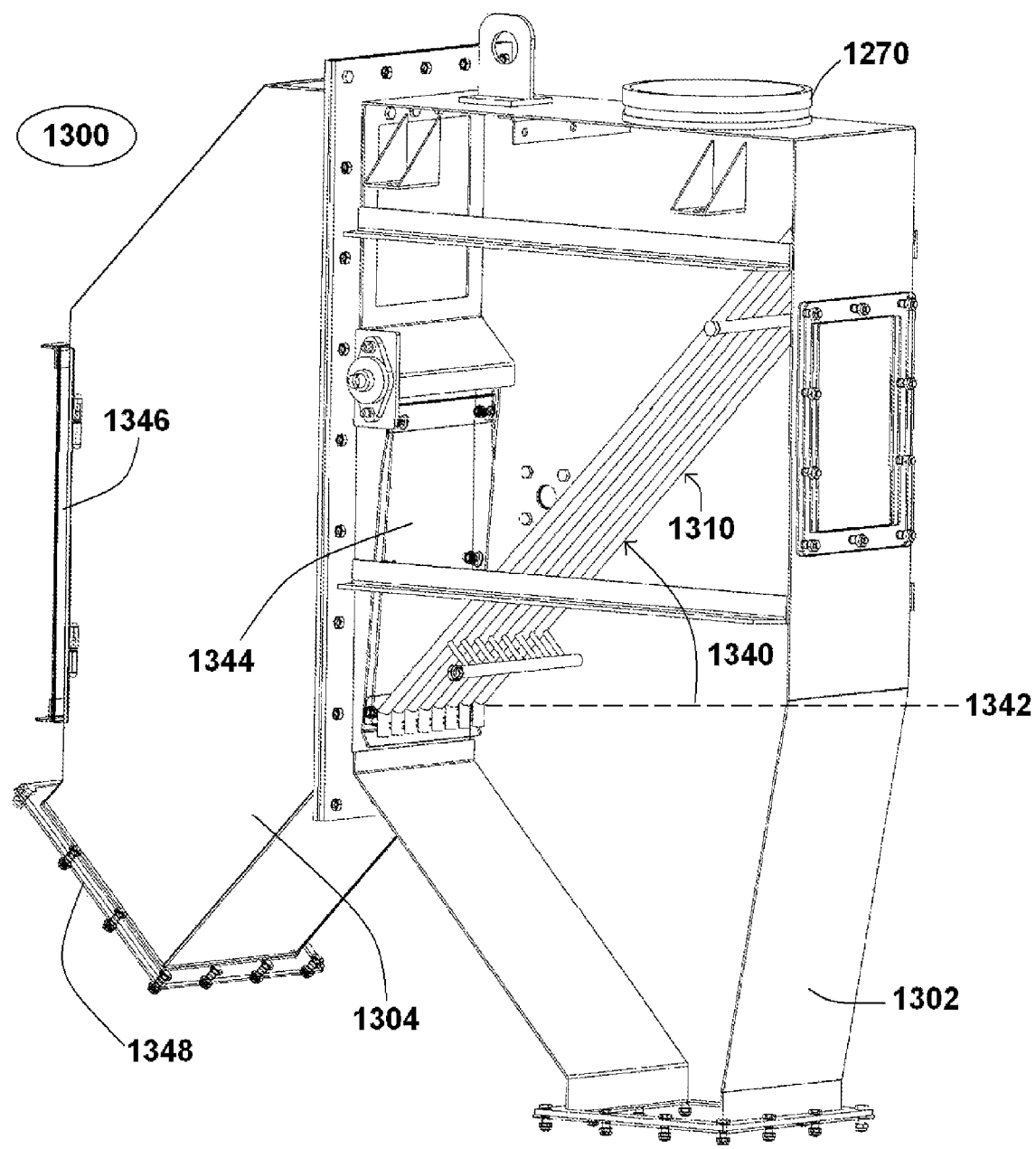
FIG. 21 is an angled perspective illustration of an agglomerate catcher and grid.

Turning now to FIG. 21, the pipe 1270 discharges the pellets and fluid slurry or concentrated slurry into an agglomerate catcher 1300 that catches, removes, and discharges pellet agglomerates through a discharge chute 1304. The agglomerate catcher 1300 includes an angled round bar agglomerate removal grid 1310, perforated plate, or screen that permits passage of fluid and pellets through discharge outlet 1302 but collects adhered, clumped, or otherwise agglomerated pellets and directs them toward the discharge chute 1304.

Figure 22:
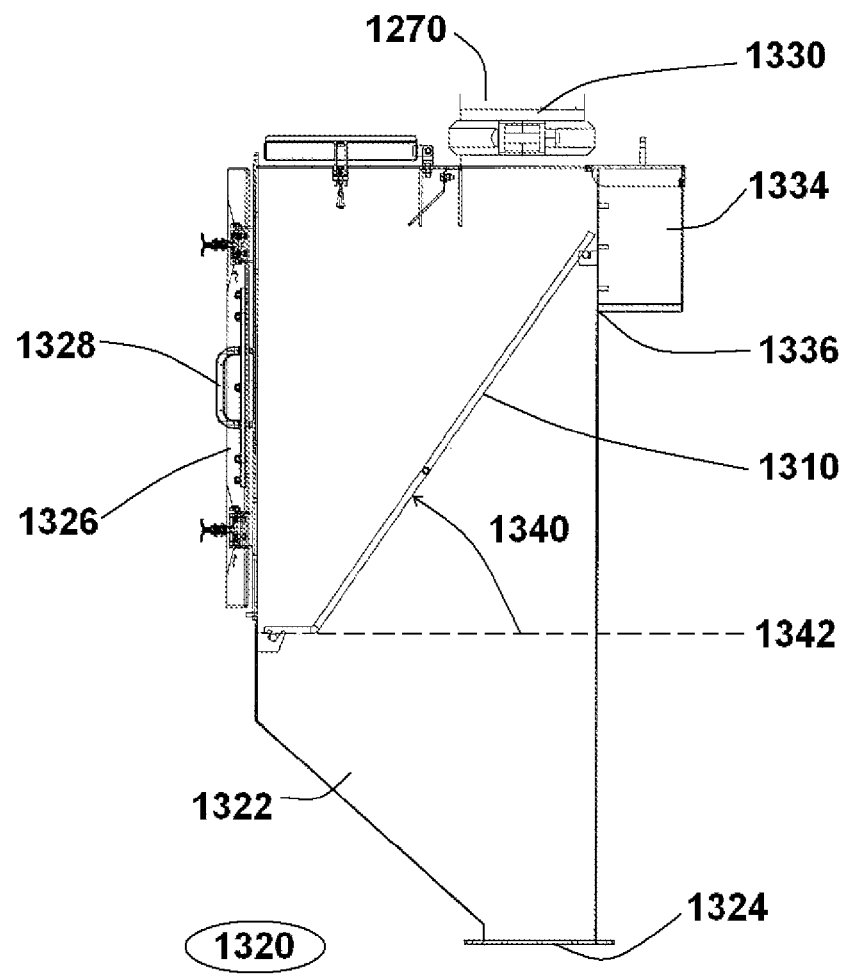
FIG. 22 is an illustration of an alternative agglomerate catcher assembly configuration with an overflow attachment.

In an alternative embodiment, FIG. 22 illustrates an overflow agglomerate catcher assembly 1320 that is comprised of a housing 1322 of any geometric configuration, that is preferably rectangular in shape and tapers downwardly and inwardly to form outlet 1324. Hingedly attached to the front of housing 1322 is access door 1326 with handle 1328. The door can be hinged at the side or at the top as space and ease of access allows. The pellet slurry enters from pipe 1270 through inlet 1330 and passes over agglomerate removal grid 1310. Attached, preferably by bolting, to the back of housing 1322 and covering an overflow opening is overflow housing 1334. The overflow opening can optionally be covered by a foraminous membrane device as described in detail below. The foraminous membrane device can be removably attached at the juncture 1336 between the housing 1322 and the overflow housing 1334 as by bolting or insertion into a slotted groove for ease of removal to clean. Alternatively, the screening device can be fixedly attached, as by welding, to the juncture 1336. The embodiment is preferable for materials prone to high levels of agglomeration formation, particularly sticky or tacky materials, such that build-up of agglomerates can be tolerated wherein the flow of the pellet slurry is not obstructed by the build-up. The choice of the screening device is of particular importance to minimize clogging during an overflow situation. This embodiment is further preferable for low fluid temperature processing and manual operations.

The agglomerate removal grids 1310 in FIGS. 21 and 22 can be at many angles of inclination 1340 that can range from approximately 0° to greater than 50° as measured from a horizontal plane that transects the lowest point of the agglomerate removal grid (indicated by the dotted line 1342 in FIGS. 21 and 22). Preferably the angle of inclination 1340 ranges from approximately 20° to greater than 50°, more preferably from approximately 40° to greater than 50° and most preferably is greater than 50° as described. The lower angle of inclination is particularly useful for manual low fluid temperature processes to allow ease of removal from accumulating agglomerates. As the process moves from manual to automatic operation, the angle of inclination is favorably raised to minimize the need for operator activity. Thus in high volume processes and/or high temperature processes, the angle of inclination greater than 50° is most preferable to allow the accumulation of agglomerates to purge itself upon opening of the gate 1344, as exemplified in FIG. 21, without need of assistance from an operator, or manually as accessed through door 1346. The subsequent release of the agglomerates into the agglomerate overflow housing 1304 and through the outlet 1348 allows remote collection and/or transport of the accumulated agglomerates away from the area of operation. Subsequently, outlet 1348 can be connected to a waste bin, a recycle bin, and other storage and transport mechanisms as are known to those skilled in the art. Additional details of the agglomerate catcher 1300 and overflow agglomerate catcher assembly 1320 designs and construction are disclosed in commonly-assigned International Patent Application Publication No. WO 2010/028074, which is incorporated herein by reference in its entirety as if fully set forth below.

Surface treatments to reduce abrasion, erosion, corrosion, wear, and undesirable adhesion and sticture, can be applied to various components of agglomerate catcher 1300 (FIG. 21) and overflow agglomerate catcher assembly 1320 (FIG. 22). Preferably, the agglomerate removal grid 1310 and inside of housing 1322 are surface treated for use in processing tacky materials. Such treatments can include nitriding, carbonitriding, sintering, high velocity air and fuel modified thermal treatments, and electrolytic plating. In addition, flame spray, thermal spray, plasma treatment, electroless nickel dispersion treatments, and/or electrolytic plasma treatments, can be utilized.

Figure 23:
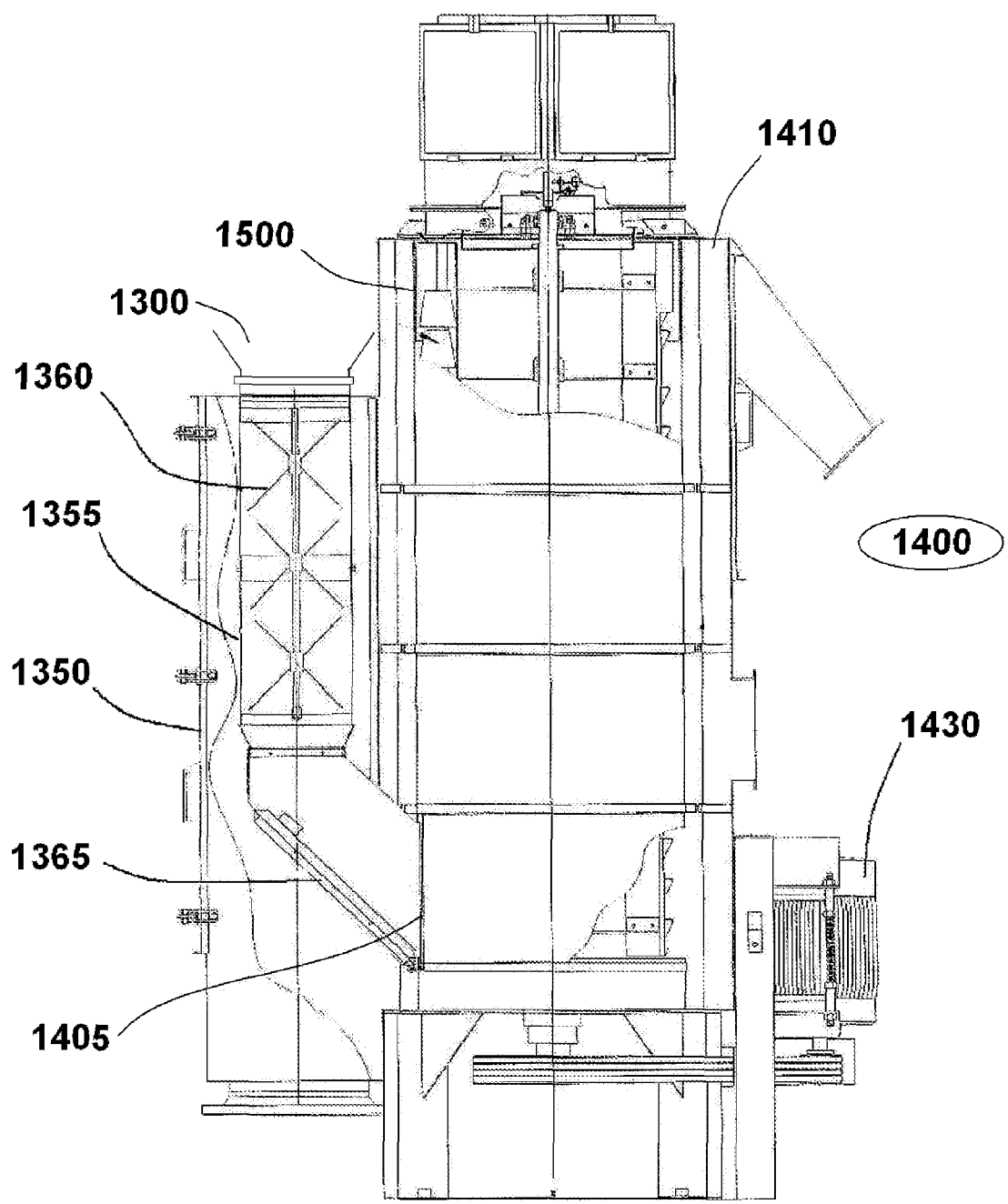
FIG. 23 is a schematic illustration of a dryer with attached defluidizing section.
Figure 24:
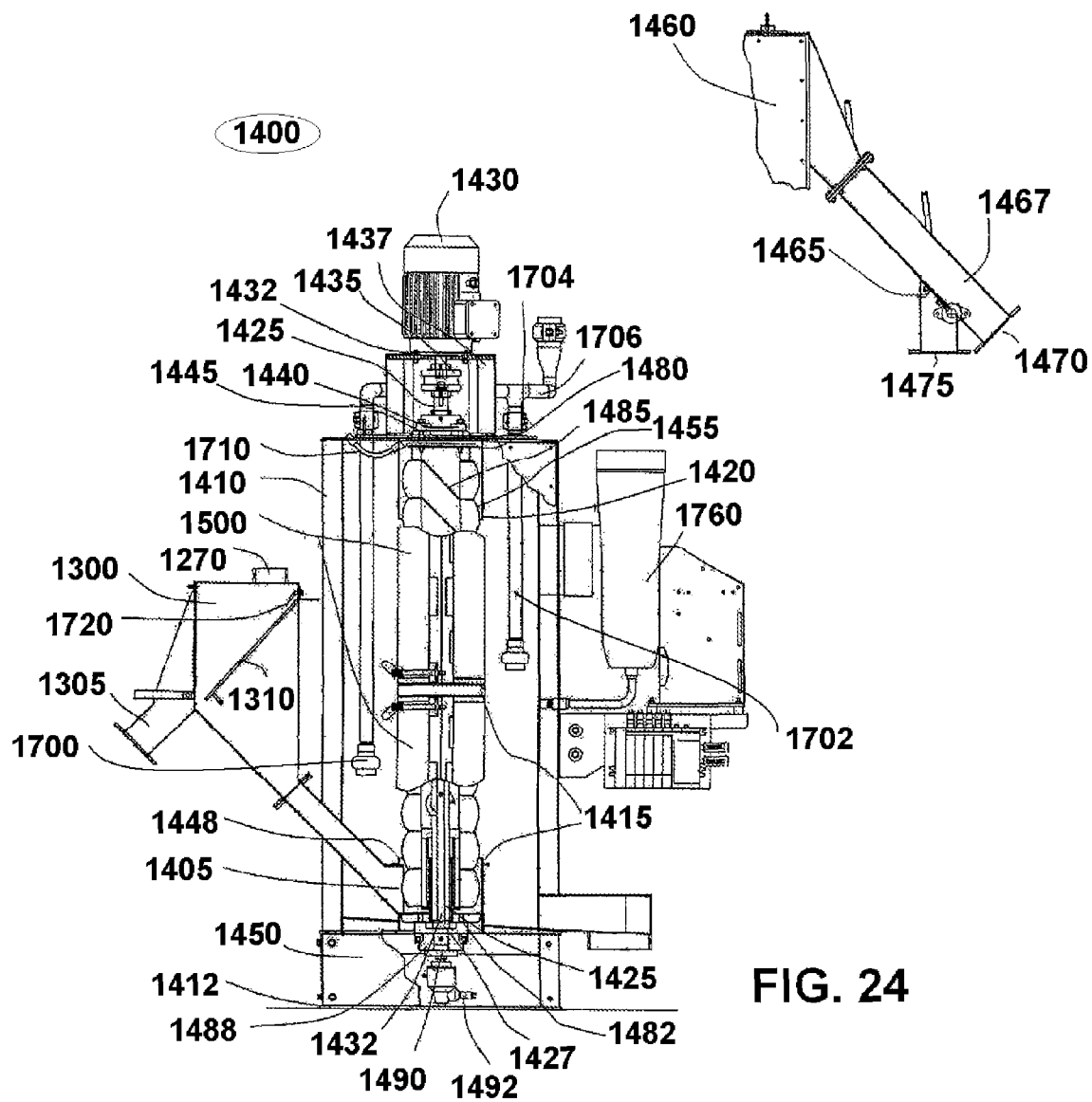
FIG. 24 is a schematic illustration of a self-cleaning dryer.
Figure 25:
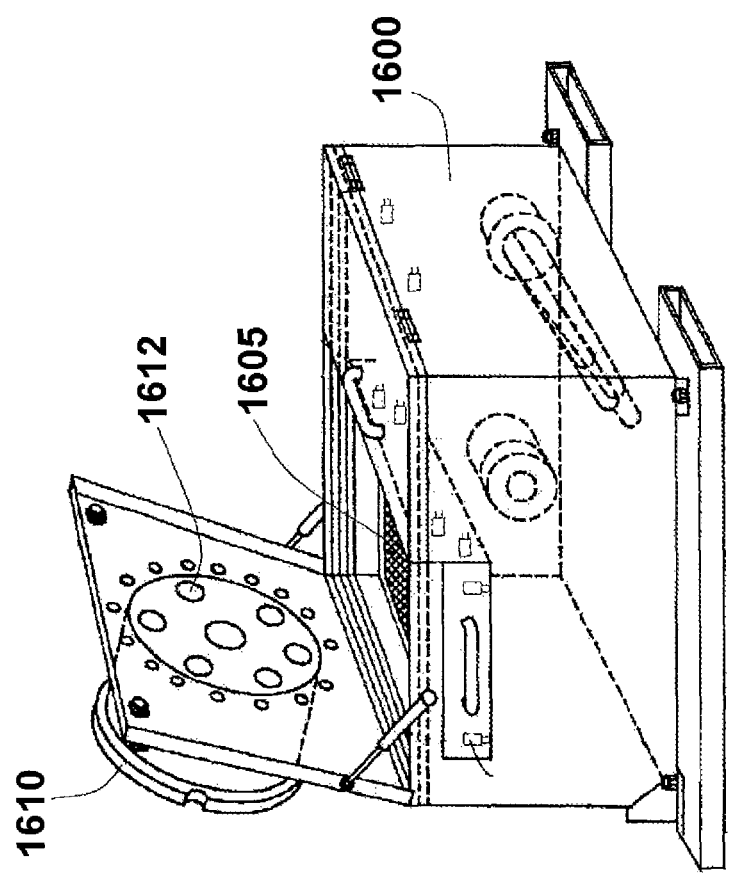
FIG. 25 is a schematic illustration of a reservoir.

The pellets and fluid slurry then pass from the discharge outlet 1302, FIG. 21 or outlet 1324, FIG. 22, into a defluidizer 1350, FIG. 23, that can include at least one vertical or horizontal defluidizing foraminous membrane 1355 containing one or more baffles 1360 and/or an inclined foraminous membrane 1365, angular or cylindrical, that enables fluid to pass downwardly into a fines removal screen 1605 and therethrough to the water reservoir 1600 (FIGS. 5 and 25). Preferably for tacky materials, baffles 1360 can be omitted to prevent adhesion, sticture, and agglomeration of the pellets. Similarly, the inclined foraminous membrane 1365 can be blocked at least partially and preferably is completely blocked to prevent adhesion, sticture, and agglomeration. The pellets that still retain moisture on their surfaces are discharged from defluidizer 1350 into the lower end of the dryer 1400 at a slurry inlet 1405, FIGS. 23 and 24.

The dryer 1400, illustrated in FIG. 23, can be of many types for achieving a controlled level of moisture for materials that can be flake-shaped, globular, spherical, cylindrical, or other geometric shapes. It can be achieved, for example, by filtration, centrifugal drying, forced or heated air convection or a fluidized bed, and is preferably a centrifugal dryer 1400.

As illustrated in FIGS. 23 and 24, the dryer 1400 includes but is not limited to a generally cylindrical housing 1410 having a vertically oriented generally cylindrical screen 1500 mounted on a cylindrical screen support 1415 at the base of the screen, and a cylindrical screen support 1420 at the top of the screen. The screen 1500 is thus positioned concentrically within the housing 1410 in radially spaced relation from the inside wall of the housing.

A vertical rotor 1425 is mounted for rotation within the screen 1500 and is rotatably driven by a motor 1430 that can be mounted at and/or connected to the base of the dryer (FIG. 23) or at the top of the dryer and is preferably mounted atop the upper end of the dryer, FIG. 24. The motor 1430 is connected to the rotor 1425 by a drive connection 1435 and through a bearing 1440 connected with the upper end of the housing. The connection 1445 and bearing 1440 support the rotor 1425 and guide the rotational movement of the upper end of the rotor. The slurry inlet 1405 is in communication with the lower end of the screen 1500 and rotor 1425 through the lower screen support section 1450 at connection 1448, and the upper end of the housing and rotor is in communication with a dried pellet discharge chute 1460 through a connection in the upper screen support section 1455 at the upper end of the housing. A diverter plate 1465 in optional outlet pipe 1467 can divert dried pellets through outlet 1470 or outlet 1475.

The housing 1410 is of sectional construction, and connected at a flanged coupling at a lower end portion of the dryer and a flanged coupling at the upper end portion of the dryer. The uppermost flange coupling is connected to a top plate 1480 that supports bearing structure 1440 and drive connection 1435 that are enclosed by a housing or guard 1437. A coupling 1432 atop the housing 1437 supports the motor 1430 and maintains all of the components in assembled relation.

The lower end of the housing 1410 is connected to a bottom plate 1412 on top of a water tank or reservoir 1600 by a flange connection 1610 as illustrated in FIG. 25. Apertures 1612 communicate the lower end of the dryer housing with the reservoir 1600 for discharge of fluid from the housing 1410 into the reservoir 1600 as the surface moisture is removed from the pellets. This removal is achieved by action of the rotor that elevates the pellets and imparts centrifugal forces to the pellets so that impact against the interior of the screen 1500 will remove moisture from the pellets with such moisture passing through the screen and ultimately into the reservoir 1600.

The optional self-cleaning structure of the dryer 1400 includes a plurality of spray nozzles or spray head assemblies 1702 supported between the interior of the housing 1410 and the exterior of the screen 1500 as illustrated in FIG. 24. The spray nozzle assembly 1702 is supported at the end of spray pipes 1700 extending upwardly through top plate 1480 at the upper end of the housing with the upper ends 1704 of the spray pipes 1700 being exposed. Hoses or lines 1706 feed high pressure fluid, preferably water at a flow rate of at least approximately 40 gallons per minute (gpm), and preferably about 60 gpm to about 80 gpm, and more preferably at 80 gpm or higher to the spray nozzles 1702. The hoses 1706 can optionally feed off a single manifold mounted on the dryer 1400.

There are preferably at least three spray head nozzle assemblies 1702 and related spray pipes 1700 and lines 1706. The spray head nozzle assembly 1702 and pipes 1700 are oriented in circumferentially spaced relation peripherally of the screen 1500 and oriented in staggered vertical relation so that pressurized fluid discharged from the spray head nozzles 1702 will contact and clean the screen 1500, inside and out, as well as the interior of the housing 1410. Thus, collected pellets that have accumulated or lodged in hang-up points or areas between the outside surface of the screen 1500 and inside wall of the housing 1410 are flushed through apertures 1612 into the reservoir 1600, FIG. 28. Similarly, leftover pellets inside the screen 1500 and outside the rotor 1425 are flushed out of the dryer and will not contaminate or become mixed with pellets passing through the dryer during a subsequent drying cycle in that a different type pellet is dried.

The region between the screen support section 1450 at the lower end of the dryer and the inner wall of the housing 1410 includes flat areas at the port openings and seams that connect the components of the dryer housing together. The high pressure water from the spray head nozzle assembly 1702 effectively rinses this region as well. The base screen support section 1450 is attached to the bottom plate 1412 of the housing 1410 and reservoir 1600 by screws or other fasteners to secure the housing and screen to the reservoir 1600. The base screen support section 1450 is in the form of a tub or basin as shown in FIG. 25. Alternatively, in other dryers the base screen support section 1450 can be in the form of an inverted tub or inverted base.

The rotor 1425 includes a substantially tubular member 1427 provided with inclined rotor blades 1485 thereon for lifting and elevating the pellets, and subsequently impacting them against the screen 1500. For tacky materials, it is preferable that the inclined rotor blades in at least a portion of the upper half of the dryer are narrower in their width as compared to the width of similar blades in the lower half of the dryer. The width being considered is the dimension across the blade as measured from the juncture with the rotor to the most distal parallel or near-parallel edge of the blade. When the uppermost row of blades is oriented perpendicularly from the rotor as are often identified as "kickers," it is preferable that these also be reduced in dimension of their width similarly defined. More preferably the uppermost rows of blades including the row of kickers are of the same reduced width for use with tacky materials. The reduction in width of rotor blades and/or kickers is at least approximately 10% less than the rotor blades in lower portions of the dryer, more preferably is at least approximately 20% less than the width of rotor blades in lower portions of the dryer, and most preferably is at least 30% narrower than the width of rotor blades in lower portions of the dryer.

A hollow shaft 1432 extends through the rotor 1425 in concentric spaced relation to the tubular member 1427 forming the rotor. The hollow shaft guides the lower end of the rotor as it extends through an opening 1482 in a guide bushing 1488 at the lower end of the rotor 1425, as well as aligned openings in bottom plate 1412 and the top wall of the reservoir 1600, respectively. A rotary coupling 1490 is connected to the hollow shaft 1432 and to a source of fluid pressure, preferably air, through hose or line 1492 to pressurize the interior of the hollow shaft 1432.

The hollow shaft 1432 includes apertures to communicate the shaft 1432 with the interior of the hollow rotor member 1427. These holes introduce the pressurized fluid into the interior of the rotor 1425. The rotor 1425 in turn has apertures in the bottom wall that communicate the bottom end of the rotor 1425 with the interior of the base or tub section 1450 to enable the lower end of the rotor 1425 and the tub section 1450 to be cleaned. Pellets flushed from the rotor and inside screen 1500 are discharged preferentially through the dried pellet outlet chute 1460.

The top of the rotor 1425 inside top section 1455 is also a hang-up point and subjected to high pressure fluid, preferably, air, to dislodge accumulated pellets. As shown in FIG. 25, a nozzle 1710 directs the high pressure air across the top of the rotor 1425 to drive accumulated pellets out of the top section and preferentially into the pellet outlet chute 1460. The nozzle 1710 is fed by an air hose or line that extends through top plate 1480 and is connected to a high pressure air source.

In addition to hang-up points or areas occurring in the dryer structure, the agglomerate catcher 1300 can also be cleaned by a separate pipe or hose 1720 controlled by a solenoid valve that directs high pressure fluid onto the pellet contact side of the angled agglomerate removal grid 1310 to clean off agglomerates that are then discharged through the discharge tube or chute 1305.

A hose and nozzle supply bursts of air to discharge chute or pipe 1460 in a direction such that it cleans the top of the rotor 1425 and the pellet discharge outlet 1460. The air discharge blows pellets past pipe connections and the diverter plate 1465 in outlet pipe 1467 for discharge of dried pellets out of the dryer.

In other dryers, the rotor 1425 can be square, round, hexagonal, octagonal, or other shape in cross-section. Rotors can also be of solid construction as disclosed in commonly-assigned International Patent Application Publication No. WO 2010/028074, which is incorporated herein by reference in its entirety as if fully set forth below.

Blower 1760 in FIG. 5 is prone to abrasion, erosion, corrosion, and wear from by-products of the pelletization process as well as from the impact and/or adhesion of pellets on the surface of blower components, and can optionally be surface treated, for example, utilizing nitriding, carbonitriding, sintering, high velocity air and fuel modified thermal treatments, and electrolytic plating. In addition, flame spray, thermal spray, plasma treatment, electroless nickel dispersion treatments, and electrolytic plasma treatments can be utilized individually or in combination.

Figure 26:
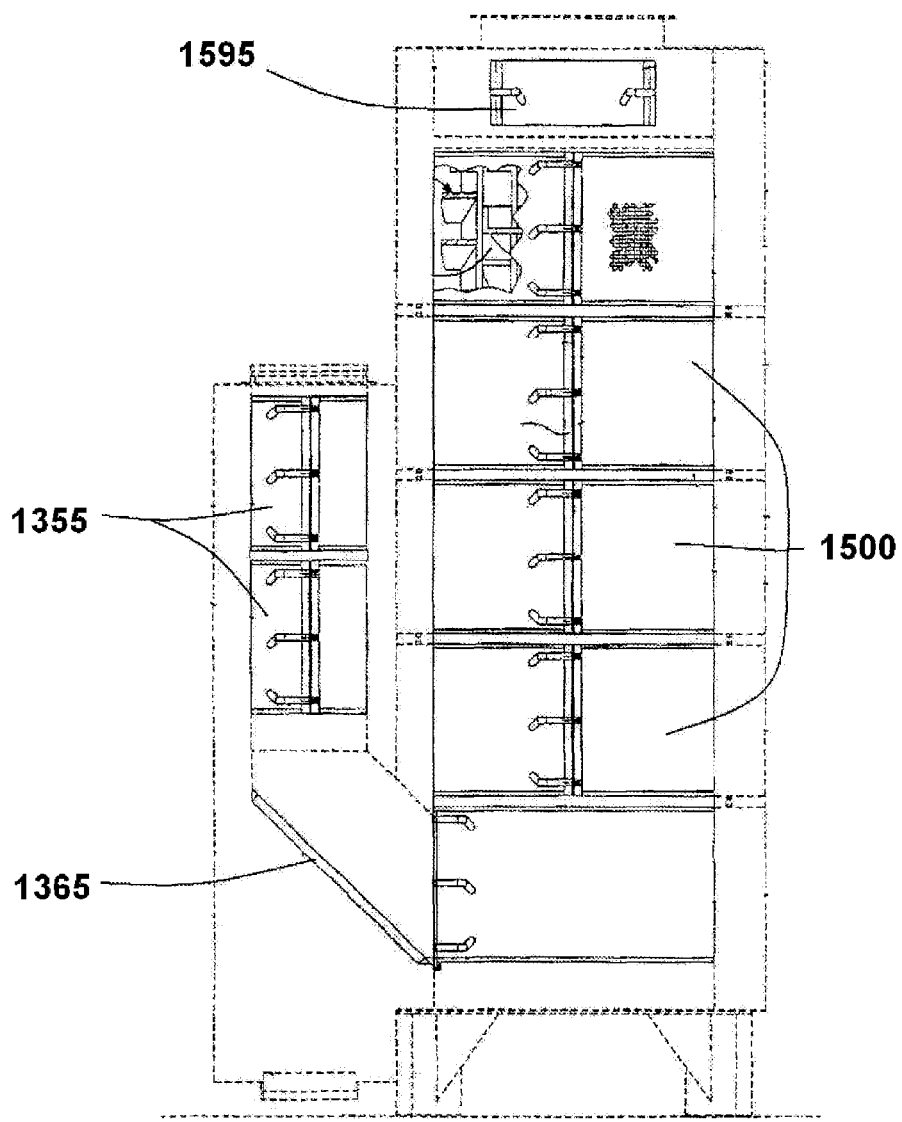
FIG. 26 is a schematic illustration of a dryer showing defluidizing screen and centrifugal drying screen positioning.

The screens for the process can include one or more optional horizontal or vertical dewatering screens 1355, inclined defluidizing screen 1365, port screens 1595, and/or one or more cylindrically attachable screens 1500, as illustrated in FIG. 26. The size, composition, and dimensions of the screens should accommodate the pellets being generated and can be perforated, punched, pierced, woven, or of another configuration known to those skilled in the art, and can be the same or different in construction, composition, and style. As the pellet size decreases in diameter, preferably the screens will be composed of two or more layers that can be of similar or different composition, design, and size. The screens are fixedly attached by latches, clamps, bolts, and any other appropriate mechanism.

The screens 1500 are preferably of suitably flexible construction as to be circumferentially placed around the dryer 1400 and rotor 1425, and can optionally be embossed and/or fitted with deflector bars (not shown) that are bolted in placed effectively segmentalizing the screen area into approximately equal areas as is known to one skilled in the art. Preferably, screens 1500 are formed from at least one layer that accomplishes the effective drying of the pellets.

The at least one layer screen 1500 can be composed of molded plastic or wire-reinforced plastic and compositionally can be polyethylene, polypropylene, polyester, polyamide or nylon, polyvinyl chloride, polyurethane, or similarly inert material that capably maintains its structural integrity under chemical and physical conditions anticipated in the operation of the centrifugal pellet dryers. Preferably, the screen 1500 is a metal plate of suitable thickness to maintain the structural integrity of the overall screen assembly and flexible enough to be contoured, exemplarily cylindrically, to fit tightly and positionally in the appropriate centrifugal pellet dryer. The metal plate is preferably 18 gauge to 24 gauge, and most preferably is 18 to 20 gauge in thickness. The plate can be formed from aluminum, copper, steel, stainless steel, nickel steel alloy, or similarly non-reactive material that is inert to the components of the drying process. Preferably, the plate is formed from stainless steel, and most preferably from Grade 304 or Grade 316 stainless steel, including low carbon grades as necessitated environmentally by the chemical processes undergoing the drying operation.

The metal plate can be pierced, punched, perforated, or slotted to form openings that can be round, oval, square, rectangular, triangular, polygonal, or other dimensionally equivalent structure to provide open areas for separation and subsequent drying. Preferably, the openings are round perforations and geometrically staggered to provide the maximum open area while retaining the structural integrity of the outer support screen. Most preferred are round perforations having a diameter of at least approximately 0.075 inches (approximately 1.9 mm) that are staggered to achieve an open area of approximately 40% or more.

Alternatively, the screen 1500 can be an assembled structure or screen composed of wires, rods, or bars, stacked angularly or orthogonally, or interwoven, and welded, brazed, resistance welded or otherwise permanently adhered in position. The wires, rods, or bars can be plastic or wire-reinforced plastic compositionally similar to the molded plastic described above or can be metal, similarly and compositionally delineated as above and can be geometrically round, oval, square, rectangular, triangular or wedge-shaped, polygonal or structurally similar. The wires, rods, or bars across the width or warp of the screen can be the same as or different dimensionally as the wires, rods, or bars longitudinally contained as the weft, shute, or otherwise known to those skilled in the art.

Preferably the wires, rods, or bars are a minimum of approximately 0.020 inches (approximately 0.5 mm) in the narrowest dimension, more preferably are at least approximately 0.030 inches (approximately 0.76 mm) in the narrowest dimension, and most preferably are approximately 0.047 inches (approximately 1.2 mm) in the narrowest dimension. Open areas are dimensionally dependent on the proximal placement of adjacent structural elements and are positionally placed so as to maintain a percent open area of at least approximately 30%, more preferably above approximately 40%, and most preferably approximately 50% or greater.

For particularly tacky materials, relative to the drying portion of the process, at least the lowermost screen section can be replaced or partially replaced by a suitably flexible blank without perforation or open area. This serves the purpose of transporting the pellets in the residual transport fluid further up into the mid-portions of the centrifugal dryer effectively reducing agglomeration, sticture and the likely blockage of the lower portions of the dryer. This blank screen can be of similar or different composition to that of the screen portion for which it serves as replacement and is consistent dimensionally with those screens or screen portions as described above.

Figure 27A:
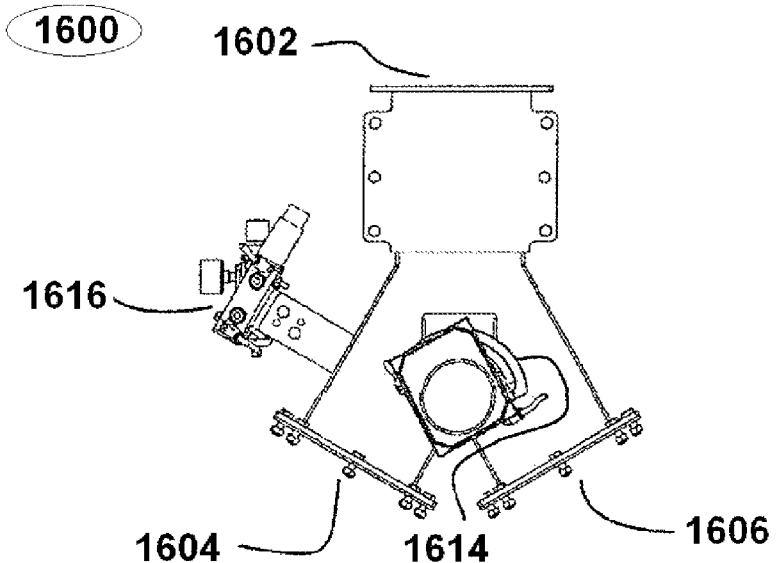
FIG. 27a is a schematic illustration of a prior art pellet diverter valve.
Figure 27B:
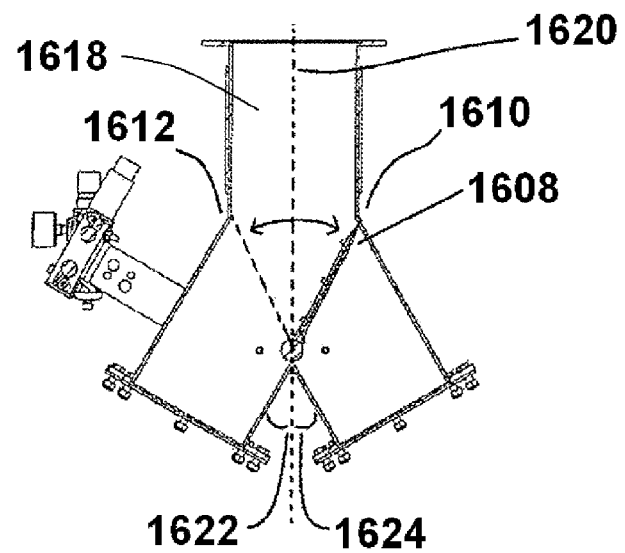

Returning to FIG. 5, pellets discharged from dryer 1400 pass into the pellet diverting section 10 (FIG. 1) into and through pellet discharge chute 1460, and optionally can be deflected through outlet 1475 as detailed above, or can pass through outlet 1470 into and through bagging/packaging section 12 (FIGS. 1 and 5). Attached to outlet 1470 is a symmetrically inverted and "Y"-shaped pellet diverter assembly 1600 as disclosed in commonly-assigned International Patent Application Number PCT/US10/25255 referenced above, and illustrated in FIGS. 27a and b. Pellet diverter inlet 1602 is coupled to outlet 1470 from FIG. 24 either directly or in addition to an appropriate extension pipe. The pellets enter the pellet diverter assembly 1600 through inlet 1602 into and through inlet pipe 1618, and are directed by diverter flap 1608 to either outlet chute 1604 or outlet chute 1606 which are symmetrically positioned about plane 1620 at preferred angles 1622 and 1624 of approximately 30°. Operation of diverter flap 1608 can be accomplished manually, electronically, hydraulically, and/or automatically including the optional use of a programmable logic controller (PLC). The above-referenced International Patent Application discloses the preferential use of a pneumatic actuator 1614 that is operated by an electronically controlled solenoid valve 1616 directed by a PLC. The speed at which the diverter flap 1608 moves can be further regulated through use of needle valves to minimize the possibility of trapping pellets between the diverter flap 1608 and the inside walls of the pellet diverter assembly 1600. In turn, each outlet chute (1604, 1606) is attachedly connected to a bagging unit as described hereinbelow.

Figure 28:
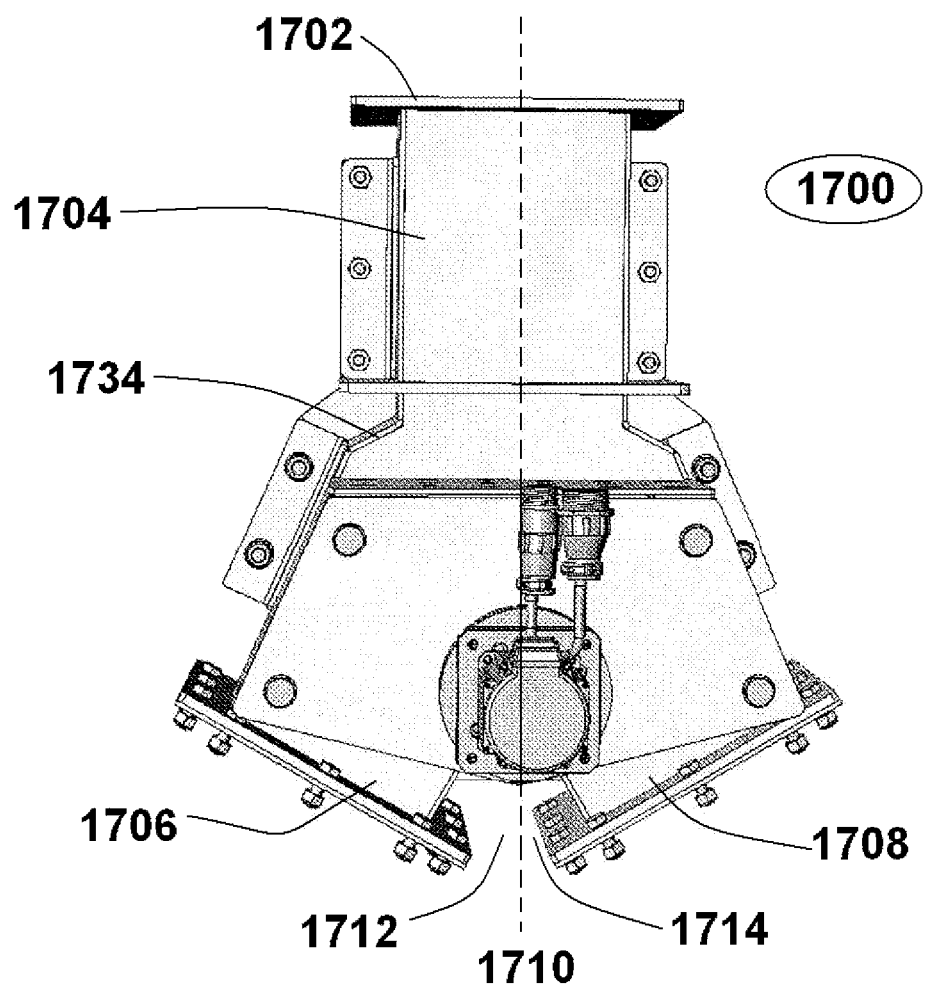
FIG. 28 is a schematic illustration of a pellet diverter valve assembly.
Figure 29:
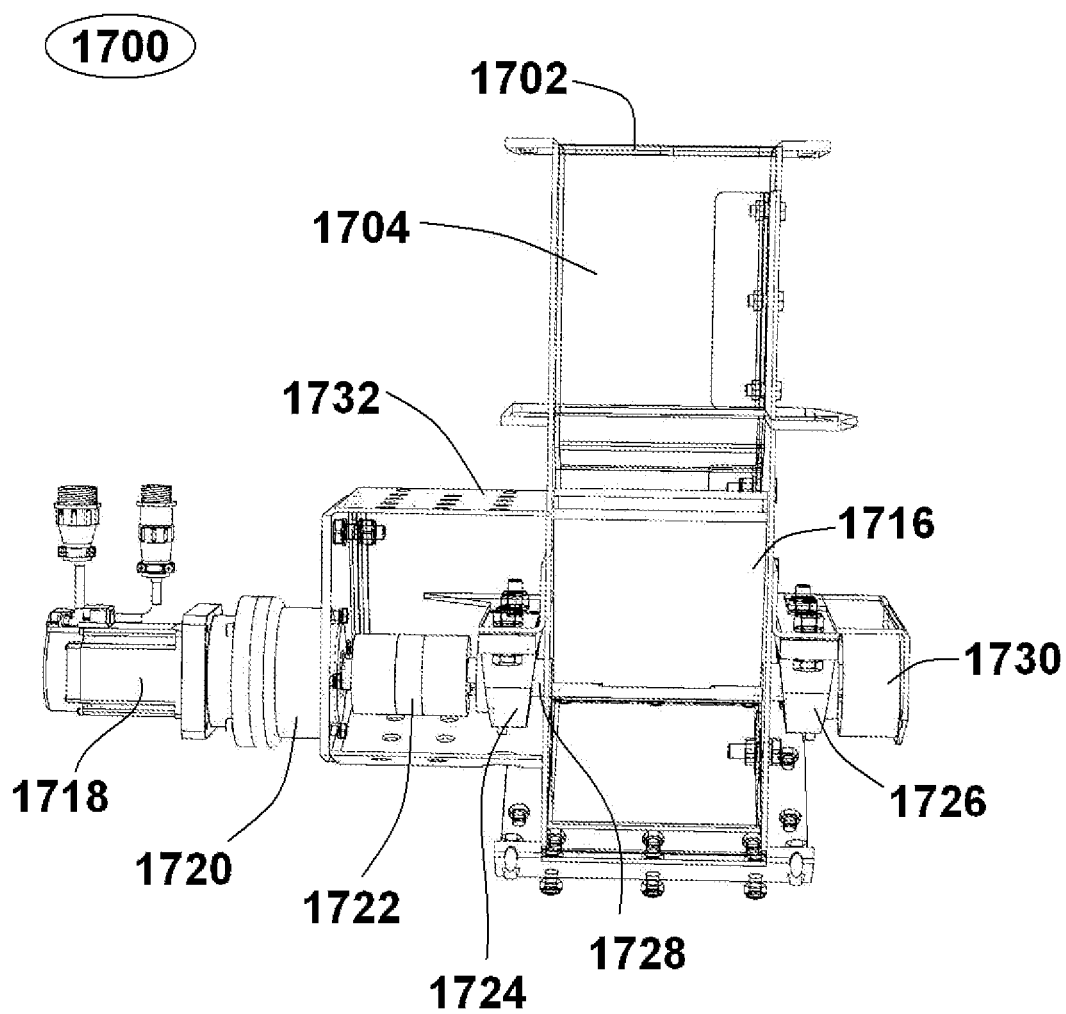
FIG. 29 is a schematic illustration of a cross-sectional view of a pellet diverter valve assembly.

FIGS. 28 and 29 illustrate another embodiment of a pellet diverter assembly 1700, with pellet inlet 1702 through which pellets pass into and through inlet tube 1704 into and through pellet chutes 1706 and 1708 disposed, preferably symmetrically, about midplane 1710 to form the respective angles 1712 and 1714. Angles 1712 and 1714 can be oriented less than 90° from midplane 1710 and are preferably approximately 15° to approximately 60° from the midplane. As above, angles 1712 and 1714 are preferably symmetrically disposed about midplane 1710 at 30°. Operation of diverter flap 1716 can be accomplished manually, electronically, hydraulically, automatically, and/or electromechanically, including the optional use of a PLC. FIG. 29 illustrates a configuration in which an electromechanical linear actuator control device 1718 (e.g., a stepper or servo-motor) connects into an through gear reduction box 1720 to coupling 1722. Solid shaft 1728 is threadingly engaged to the linear actuator control device 1718 through coupling 1722, and is positionally maintained by bearings, preferably roller bearings, 1724 and 1726. Diverter flap 1716 is coupled to solid shaft 1728 and is positionally monitored by visual indication or optionally by limit or proximity switches 1730. Use of linear actuation, permits variable speed fine control of the opening and closing of diverter flap 1716 so as to avoid the accidental entrapment of pellets between diverter flap 1716 and the inner wall of the pellet diverter assembly 1700.

To better accommodate the dimensionally continuous open flow area of the transition from the inlet tube 1704 into pellet chutes 1706 and 1708, housing offset 1734, FIG. 28, facilitates the movement of the edge of the diverter flap 1716 past the juncture. The rate at which the diverter flap 1716 moves across the gap and approaches the housing offset 1734 can be varied such that pellets are not trapped between the diverter flap 1716 and the inner wall of the pellet diverter assembly 1700 such that the rate is preferably slowed once the diverter flap 1716 is in close proximity to the housing offset 1734. The housing offset 1734 additionally provides an extended area for the motion of the diverter flap 1716 to discontinue. Thus, pellet diverter assembly 1700 prevents abrupt closure of the diverter flap 1716 with the inner surface. Additionally, perforated ventilation shield 1732, FIG. 29, allows ambient circulation of air about coupling 1722 to insure proper cooling as required.

Pellets pass through the pellet diverting section 10 into the bagging/packaging section 12 according to FIG. 1. Conventional bagging units of any design can be connected to at least one pellet chute 1706 or 1708. For continuous operation at least two bagging machines must be attached, one to each of pellet chutes 1706 and 1708. The pellet chutes, as well as the bagging machines, can be the same or different and the size of the bag or packaging made on the different bagging machines can be the same or different. Preferably, the pellet chutes 1706 and 1708 are dimensionally the same and the bagging machines are the same. Pellet chute extensions can be coupled to at least one of the pellet chutes. The length of any pellet chute extensions, the number of bagging machines, and the multiplicity of the pellet chutes that can be used is limited by the momentum of the pellets freely falling from the pellet discharge outlet 1460 of dryer 1400 (FIG. 24).

Figure 30:
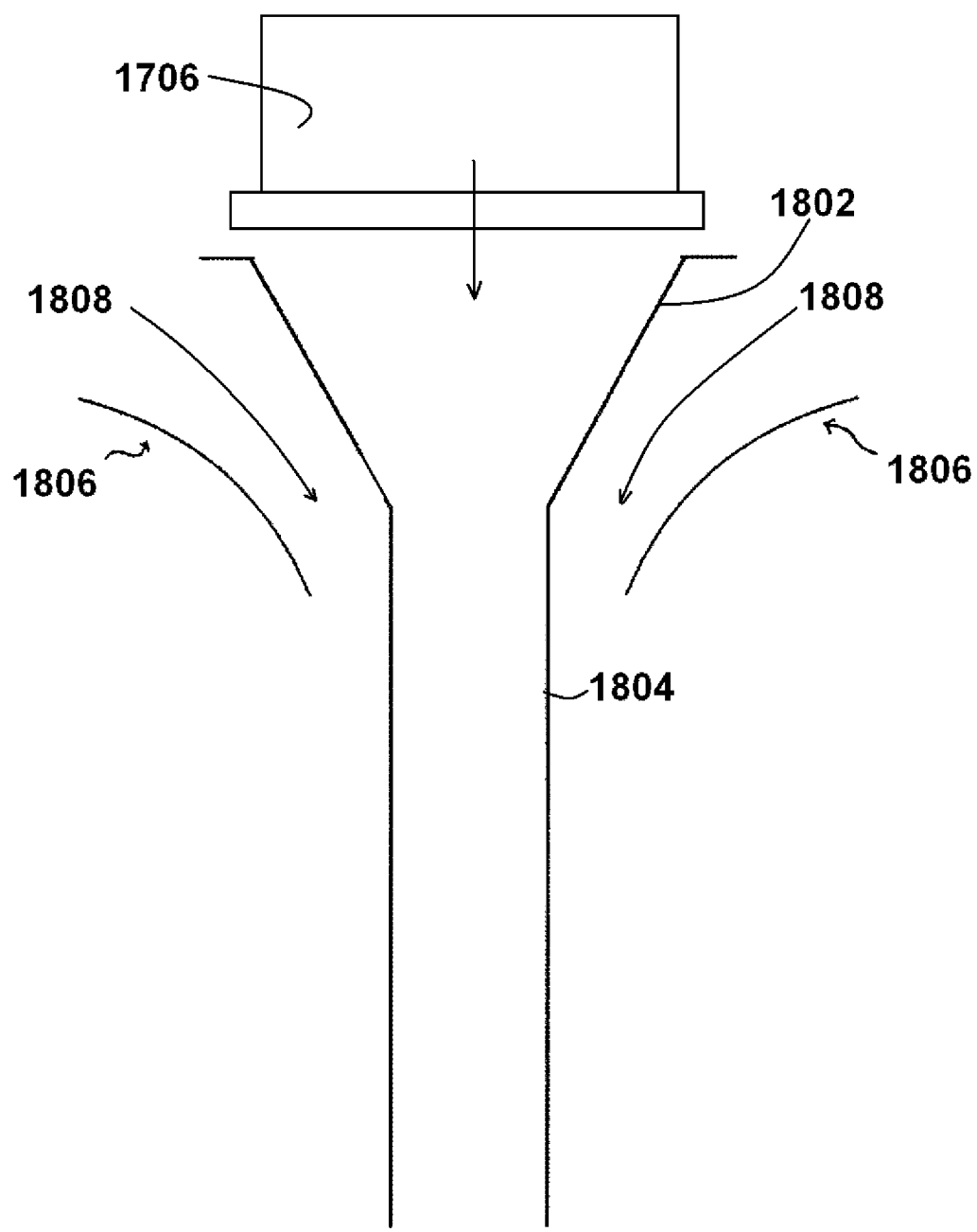
FIG. 30 is a schematic illustration of a cross-sectional view of a funnel and forming tube used for pellet bagging.

The bagging machine(s) can be of any design as is known to those skilled in the art. Preferably the bagging machine forms the bag vertically allowing the pellets to fill the bag through a forming tube and ultimately seals and releases the bagged/packaged product. As illustrated in FIG. 30, pellets traverse through pellet chute 1706, for example, and freely fall into and through optional pellet chute extensions into collecting funnel 1802 and are thus directed into and through forming tube 1804. By way of example, the bagging material is fed and/or pulled under tension as a sheet through tension rollers over forming collar 1806 as indicated by arrows 1808 and around forming tube 1804. The edges of the bagging material are sealed along at least a portion of the length of the forming tube 1804. The now tubular bagging material continues to be fed and/or pulled along the length of the forming tube 1804 extending past the lowermost edge of forming tube 1804 to form a freely suspended tube. The length of the tube thus formed is adjusted according to the need of the size of the bag and/or the quantity of the packaged material needed. The tube is sealed across its diameter, preferably horizontally and perpendicularly to the length of the tube. Such sealing, thermal or otherwise, can be simultaneous with or independent of the sealing of a predecessor bag as is known to those skilled in the art. Where the top of one bag is sealed to form the completed package simultaneously with sealing the bottom edge of the next sequential bag, separation of those bags can be achieved by the actual sealing mechanism and is preferentially achieved by a physical cut made across and through the fully sealed area. Such separation can be done at the time of sealing or can be accomplished as a part of any subsequent downstream processing as needed. Post-processing can include additional packaging, labeling, assembly into boxes, and the like without intending to be limited in scope or in function.

Collecting funnel 1802 in FIG. 30 can be coupled to pellet chute 1706 or can be separated such that the pellets fall therebetween. Collecting funnel 1802 and forming tube 1804 can be of any material of construction including plastic or metal compatible with the composition of the material being processed and capable of fulfilling the equipment operating requirements of the bagging process and are preferably stainless steel.

The quantity of material charged into the bag is dependent on the production rate for the pellets, the length of time the diverter flap 1716 is positioned to direct flow of the pellets into and through the respective pellet chutes 1706 and 1708, FIG. 28, as well as the size of the bag. Operation of the bagging process including control of the bagging machine(s) and any automated controlling device for the diverter flap 1716, can be controlled by at least one PLC. Feedback mechanisms, preferably weight-measuring devices, can be integrated with the bagging process and under PLC control such that the timing of the diverter flap 1716 can be modified to maintain reproducibility as needed in the final bagged/packaged product being delivered.

The bag can be purged by conventional means with inert gas (e.g., air, carbon dioxide, nitrogen, and the like) or can be evacuated. Addition or reduction of gas and other volatiles can be achieved during the bag-filling process by introduction into the form filling tube 1804 and/or collecting funnel 1802 or can be done just prior to the sealing of the bag. Similarly, the bag can contain perforations, also by conventional means, dimensioned such that the pellets and any other materials contained in the bag cannot leak out.

For particularly problematic tacky materials, pellets can be coated with tack-reducing powders prior to the bagging process. This can be done by introducing the appropriate powdered material as, for example, by feeding it into at least one of the components of the pellet diverting section 10 in FIGS. 1 and 5. Powders so introduced can include silica, calcium carbonate, clay, wax, microcrystalline wax, polymers, talc, fly ash, graphite, limestone, grit, sulfur, and the like. The powder falls freely and admixes with the similarly freely-falling tacky material pellets adhering to the surface as it traverses through the assembly. Extra powder can be bagged and/or packaged or can be removed if necessary as by vacuum for example.

Bagging materials can include paper, cellulosics, polymers, and the like that can be removed from the pelleted contents for later application. Preferably, the bagging materials are compatible with the pelleted contents and are included along with the contents in the appropriate applications. Materials that can be used for bagging can include ethylene-based polymers, such as ethylene/vinyl acetate, acrylic polymers, ethylene acrylate, ethylene methacrylate, ethylene methyl acrylate, ethylene methyl methacrylate, polyethylene including linear low density, ultralow density, low density, medium density, and high density, polyamides, polybutadiene rubber, polyesters, polyethylene terephthalate, polybutylene terephthalate, polycarbonates, polyolefins, polypropylene, polyacrylamides, polyacrylonitrile, polymethylpentene, polyphenylene sulfide, polyurethanes, styrene-acrylonitrile, acrylonitrilebutadienestyrene, styrene butadiene rubbers, polyphenylene sulfide, polyvinyl halides, polyvinylidene dihalides, silicones, fluoropolymers, rubber-modified polymers, and blends, copolymers, and terpolymers thereof. Compatible materials used for bagging as used herein should not alter the formulation of the contents detrimentally and are capable of being mixed and/or dissolved uniformly and completely with the contents of the bag in the final application. Compatible materials for use in bagging are disclosed in reissued U.S. Pat. No. RE 36,177, which is incorporated by reference in its entirety as if fully set forth below.

The bagging material can range in thickness from approximately 0.012 inches (approximately 0.30 mm) to approximately 0.0005 inches (approximately 0.0127 mm), and preferably ranges from approximately 0.0045 inches (approximately 0.114 mm) to approximately 0.00075 inches (approximately 0.019 mm). Most preferably, the bagging material can range in thickness from approximately 0.002 inches (approximately 0.05 mm) to approximately 0.0008 inches (approximately 0.02 mm). One or more layers of bagging materials can be used, and the bagging material(s) can contain additives and release agents, including anti-foaming agents, anti-oxidants, stabilizers, and the like. For compatible bagging materials the additives contained therein must similarly be compatible as described hereinabove.

It should be noted that the surface treatments as specifically applied to the inside of the agglomerate catcher, the agglomerate removal grid, the inside of the dryer housing and especially the upper portion of the dryer housing, as well as the components of the pellet diverting section and the funnel and forming tube of the bagging section described hereinabove are preferentially at least two layers such that one layer is comprised of a highly wear-resistant material that is applied so as to confer a rough and highly textured surface over which is then uniformly coated a polymeric material that only partially fills the texturing of the wear-resistant material and provides an additional non-stick surface to prevent undesirable adhesion, sticture, and agglomeration of pellets as they are transported therethrough. Most preferably the wear-resistant component is ceramic and the non-stick polymeric material is silicone, fluoropolymers, and combinations, thereof.

What is claimed is:

1. A system for continuously bagging tacky materials, the system comprising:
    a feeding section configured to receive a material, wherein the feeding section is optionally thermally controlled;
    a mixing section configured to receive the material from the feeding section and mix, melt, and/or blend the material, wherein the mixing section comprises a die comprising a removable insert with a taper angle that is less than or equal to about 25 degrees;
    a pelletizing section configured to receive the material from the mixing section and pelletize the material, wherein the pelletizing section comprises:
        a cutter hub comprising a blade angle of less than about 90 degrees, a blade cutting angle that is less than or equal to about 20% less than the blade angle, and a blade traverse angle of about 0 degrees to about 55 degrees; and
        a transport fluid box comprising an inlet and an outlet to reduce a velocity of transport fluid into and through the transport fluid box, wherein the inlet directs a flow of transport fluid directly across a cutting face of a pelletizing die, and wherein the outlet reduces any obstruction of pellets leaving the transport fluid box by providing an open area;
    a system of non-linear transport piping downstream of the transport fluid box, wherein the non-linear transport piping comprises long-radius angles;
    an agglomerate catcher downstream of the pelletizing section, wherein the agglomerate catcher comprises an angled agglomerate removal grid, wherein an angle of inclination of the agglomerate removal grid is at least about 0 degrees, and wherein the non-linear transport piping is configured to allow transport of the material from the pelletizing section to the agglomerate catcher;
    a defluidizing section downstream of the agglomerate catcher, wherein the defluidizing section comprises a pellet feed chute that is partially blocked to prevent filtration of the transport fluid from the material, wherein the defluidizing section comprises no obstructive baffles;
    a drying section configured to receive the material from the defluidizing section and dry the pelletized material, wherein the drying section comprises a dryer comprising:
        a rotor with rotor blades in an upper portion of the rotor that are at least about 10% narrower than rotor blades in a lower portion of the rotor; and
        at least two circumferential screens about the rotor such that at least a lowermost screen is a blank;
    a pellet diverter valve downstream of the drying section, wherein the pellet diverter valve comprises:
        an inlet configured to receive an incoming flow of pellets from the drying section;
        a housing;
        a housing offset such that a diverter flap moves inside the housing into the housing offset to provide an open area through which the pellets traverse, wherein the open area has a cross-sectional area that is no less than the pellet diverter valve inlet; and
        at least a first and second outlet, each configured to dispense an outgoing flow of pellets;
    at least a first and second bagging assembly in communication with at least the first and second outlets of the pellet diverter valve, respectively, wherein the at least the first and second bagging assemblies are configured to alternatingly receive a specific quantity of pellets from the pellet diverter valve to allow continuous bagging of the pellets; and
    a surface treatment applied to at least a portion of a surface of a component of the feeding section, mixing section, pelletizing section, transport piping, agglomerate catcher, defluidizing section, drying section, pellet diverter valve, and/or bagging assemblies to reduce abrasion, erosion, corrosion, wear, and undesirable adhesion and stricture, wherein the surface treatment comprises at least two layers such that the surface formed following treatment is three-dimensionally textured, wherein the at least two layers comprise at least one layer of a wear-resistant material that is uniformly overcoated with a non-stick polymer that only partially fills the three-dimensional surface texture of the at least one layer of wear-resistant material.

2. The system for continuously bagging tacky materials of claim 1, wherein the taper angle of the removable insert is less than or equal to about 15 degrees.

3. The system for continuously bagging tacky materials of claim 1, wherein the taper angle of the removable insert is less than or equal to about 10 degrees.

4. The system for continuously bagging tacky materials of claim 1, wherein a gap between the removable insert and a body of the die is less than or equal to about 0.010 inches.

5. The system for continuously bagging tacky materials of claim 4, wherein the gap between the removable insert and the die body is less or equal to about 0.005 inches.

6. The system for continuously bagging tacky materials of claim 1, wherein a face of the removable insert extends beyond a surface edge of the die body.

7. The system for continuously bagging tacky materials of claim 6, wherein the face of the removable insert extends beyond the surface edge of the die body less than or equal to about 0.080 inches.

8. The system for continuously bagging tacky materials of claim 6, wherein the face of the removable insert extends beyond the surface edge of the die body less than or equal to about 0.060 inches.

9. The system for continuously bagging tacky materials of claim 1, wherein the taper angle of the removable insert is less or equal to about 10 degrees, wherein a gap between the removable insert and a body of the die is less than or equal to about 0.005 inches, and wherein a face of the removable insert extends beyond a surface edge of the die body is about 0.060 inches to about 0.080 inches.

10. The system for continuously bagging tacky materials of claim 1, wherein the cutter hub is streamlined to have an extended hexagonal cross-section.

11. The system for continuously bagging tacky materials of claim 1, wherein the blade angle of the cutter hub is about 20 degrees to about 60 degrees.

12. The system for continuously bagging tacky materials of claim 1, wherein the blade cutting angle of the cutter hub is less than or equal to about 15% less than the blade angle.

13. The system for continuously bagging tacky materials of claim 1, wherein the blade traverse angle is about 20 degrees to about 55 degrees.

14. The system for continuously bagging tacky materials of claim 1, wherein the cutter hub comprises a blade angle of about 30 degrees to about 50 degrees, a blade cutting angle less than or equal to about 15% less than the blade angle, and a blade traverse angle of about 20 degrees to about 55 degrees.

15. The system for continuously bagging tacky materials of claim 1, wherein the die of the mixing section comprises a die hole having a land that is continuous.

16. The system for continuously bagging tacky materials of claim 1, wherein the inlet and outlet of the transport fluid box facilitate enhanced flow rate and volume of the transport fluid across the face of the pelletizing die such that an increased volume of transport fluid is present relative to the number of pellets and such that the reduced concentration of pellets is removed from the transport fluid box more efficiently to reduce a likelihood of adhesion, sticture, and agglomeration of the pellets.

17. The system for continuously bagging tacky materials of claim 1, wherein the angle of inclination of the angled agglomerate grid is at least about 20 degrees.

18. The system for continuously bagging tacky materials of claim 1, wherein the angle of inclination of the angled agglomerate grid is at least about 40 degrees.

19. The system for continuously bagging tacky materials of claim 1, wherein the angle of inclination of the angled agglomerate grid is at least about 50 degrees.

20. The system for continuously bagging tacky materials in claim 1 wherein the at least one layer of wear-resistant component of the surface treatment is a ceramic.

21. The system for continuously bagging tacky materials of claim 1, wherein the non-stick polymer of the surface treatment is a silicone, fluoropolymer, or a combination thereof.

22. The system for continuously bagging tacky materials of claim 1, wherein the diverter flap of the pellet diverter valve is operated manually, electronically, hydraulically, automatically, and/or electromechanically.

23. The system for continuously bagging tacky materials of claim 1, wherein the rotor blades in the upper portion of the rotor are at least 20% narrower than the rotor blades in the lower portion of the rotor.

24. The system for continuously bagging tacky materials of claim 1, wherein the rotor blades in the upper portion of the rotor are at least 30% narrower than the rotor blades in the lower portion of the rotor.

* * * * *